United States Patent
Wei

(10) Patent No.: US 11,364,440 B2
(45) Date of Patent: Jun. 21, 2022

(54) COMPUTER VIDEO GAME APPLICATION PERFORMANCE RESULT

(71) Applicant: TENCENT TECHNOLOGY (SHENZHEN) COMPANY LIMITED, Shenzhen (CN)

(72) Inventor: Jiacheng Wei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 81 days.

(21) Appl. No.: 16/872,175

(22) Filed: May 11, 2020

(65) Prior Publication Data
US 2020/0269141 A1    Aug. 27, 2020

Related U.S. Application Data

(63) Continuation of application No. PCT/CN2019/072409, filed on Jan. 18, 2019.

(30) Foreign Application Priority Data

Jan. 22, 2018 (CN) .......................... 201810060972.8

(51) Int. Cl.
*A63F 13/77* (2014.01)
*A63F 13/35* (2014.01)

(52) U.S. Cl.
CPC .............. *A63F 13/77* (2014.09); *A63F 13/35* (2014.09)

(58) Field of Classification Search
CPC ......... A63F 13/77; A63F 13/35; A63F 13/798
(Continued)

(56) References Cited

U.S. PATENT DOCUMENTS 8,676,812 B1 * 3/2014 Wu .................... G06F 16/9535
707/748
2009/0104956 A1 4/2009 Kay et al.
(Continued)

FOREIGN PATENT DOCUMENTS

CN 101470924 A 7/2009
CN 106512396 A 3/2010
(Continued)

OTHER PUBLICATIONS

Chinese Office Action Issued in Application No. CN201810060972.8 dated Jun. 30, 2020 with concise English Translation, (21 pages).
(Continued)

*Primary Examiner* — Michael A Cuff
(74) *Attorney, Agent, or Firm* — Arentfox Schiff LLP

(57) ABSTRACT

A method for providing a performance result in a computer video game application is provided. Target user performance data of a target control object controlled by a target user and additional performance data of at least one additional control object in an execution process of a target scene of the computer video game application are obtained. The performance result of the target control object in the execution process of the target scene is determined based on (i) the target user performance data and (ii) a relationship between the target user performance data and the additional performance data. The performance result is transmitted to a terminal of the target control object.

20 Claims, 9 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 2010/0138775 | A1* | 6/2010 | Kohen | G06F 11/3072 715/781 |
| 2013/0254278 | A1* | 9/2013 | Buhr | G06Q 50/01 709/204 |
| 2013/0254680 | A1* | 9/2013 | Buhr | G06Q 50/01 715/753 |
| 2017/0236237 | A1* | 8/2017 | Smuts | G07F 17/3272 700/92 |
| 2018/0221769 | A1* | 8/2018 | Kosai | A63F 13/493 |
| 2019/0192971 | A1* | 6/2019 | Eatedali | A63F 13/58 |
| 2020/0051460 | A1* | 2/2020 | Bedor | G09B 5/065 |
| 2022/0028212 | A9* | 1/2022 | Yang | G07F 17/3272 |

FOREIGN PATENT DOCUMENTS

| | | |
|---|---|---|
| CN | 102682196 A | 9/2012 |
| CN | 108310774 A | 7/2018 |
| JP | 2002-157817 A | 5/2002 |
| JP | 2004-041559 A | 2/2004 |
| JP | 2010-531159 A | 9/2010 |

OTHER PUBLICATIONS

Teng Niu Xiao Ban, "How to Calculate the Score for League of Legends (LOL), (TGP) Tencent Games Platform's Scoring Explanation", https://www.qqtn.com/article/article_152811_1.html>, Sep. 7, 1016 (1 page).
Crystal Chaung, "How is the League of Legens MVP Calculated?", https://www.zhihu.com/question/68389711, Nov. 21, 2017 (1 page).
Bobolele1016, "How to Calculate the Score in Honor of Kings", https://wenda.so.com/q/1514698626210747?src=140&q=%E7%8E%8B%E8%80%85%E8%6D%A3%E8%80%80%E8%AF%84%E5%86%86%E6%80%8E%E4%B9%88%E7%AE%97. Oct. 24, 2017 (1 page).
International Search Report Issued in Application PCT/CN2019/072409 dated Apr. 16, 2019, with English Machine Translation (6pages).
Written Opinion Issued in Application PCT/CN2019/072409 dated Apr. 16, 2019 (4pages).

* cited by examiner

| Player | | Equipment | | | | | | Kill/Death/Assist | Evaluation score | Gold coins |
|---|---|---|---|---|---|---|---|---|---|---|
| | AAA | (11) | (12) | (13) | ( ) | ( ) | ( ) | 3 / 3 / 4 | 6.9 | 4284 |
| | BBB | (21) | (22) | (23) | ( ) | ( ) | ( ) | 4 / 2 / 0 | 6.5 | 4198 |
| | CCC | ◇MVP | (31) | (32) | (33) | (34) | ( ) | 9 / 3 / 2 | 10.9 | 5136 |
| | DDD | (41) | (42) | (43) | (44) | ( ) | ( ) | 1 / 1 / 4 | 7.1 | 4036 |
| | EEE | (51) | (52) | (53) | (54) | ( ) | ( ) | 5 / 2 / 2 | 7.7 | 4866 |
| | FFF | ◇MVP | (61) | (62) | (63) | ( ) | ( ) | 3 / 4 / 3 | 9.2 | 3791 |
| | GGG | (71) | (72) | ( ) | ( ) | ( ) | ( ) | 1 / 7 / 3 | 5.6 | 3305 |
| | HHH | (81) | (82) | (83) | (84) | ( ) | ( ) | 1 / 3 / 3 | 7.9 | 3701 |
| | III | (91) | (92) | ( ) | ( ) | ( ) | ( ) | 2 / 5 / 1 | 6.4 | 3257 |
| | JJJ | (101) | (102) | (103) | ( ) | ( ) | ( ) | 4 / 3 / 0 | 8.1 | 3879 |

Data | Return to lobby | One more round

FIG. 6

COMPUTER VIDEO GAME APPLICATION PERFORMANCE RESULT

RELATED APPLICATION

This application is a continuation of International Application No. PCT/CN2019/072409, filed on Jan. 18, 2019, which claims priority to Chinese Patent Application No. 201810060972.8, filed on Jan. 22, 2018, and entitled "RUNNING RESULT TRANSMISSION METHOD AND APPARATUS, STORAGE MEDIUM, AND ELECTRONIC DEVICE." The entire disclosures of the prior applications are hereby incorporated by reference in their entirety.

FIELD OF THE TECHNOLOGY

This application relates to communications technologies.

BACKGROUND OF THE DISCLOSURE

In many application programs, after a scene is run, performance of an operation status of a control object participating in the scene is evaluated to form a scoring system. In a related scoring method, reference factors used for measurements are relatively simple, and an operating level of an account cannot be fully and accurately assessed. Consequently, a user controlling the account cannot get an evaluation matching the performance of the user in a scene, which can diminish motivation of the user to participate again.

For the foregoing problem, no effective solutions have been provided at present.

SUMMARY

Embodiments of this application provide a method and apparatus for providing a performance result in a computer video game application, a non-transitory computer-readable storage medium, and an electronic device, to resolve at least a technical problem of relatively low accuracy in determining a performance result of a target control object in a target scene in the related art.

According to one aspect of the embodiments of this application, a method for providing a performance result in a computer video game application is provided. In the method, target user performance data of a target control object controlled by a target user and additional performance data of at least one additional control object in an execution process of a target scene of an application are obtained. The performance result of the target control object in the execution process of the target scene is determined based on (i) the target user performance data and (ii) a relationship between the target user performance data and the additional performance data. The performance result is transmitted to a terminal of the target control object.

In an embodiment, the additional performance data includes at least one of first performance data of a first control object or second performance data of a second control object, the target control object and the first control object belonging to a first group in the execution process of the target scene, and the second control object belonging to a second group in the execution process of the target scene. The determination of the performance result of the target control object includes determining the performance result of the target control object in the execution process of the target scene based on the target user performance data and a relationship between the target user performance data and the additional performance data of at least one of the first control object or the second control object.

In an embodiment, the determination of the performance result of the target control object includes determining a first dimensional performance result based on first dimensional data of the target user performance data, the first dimensional data indicating a number of times an operation result occurs in the target control object in the execution process of the target scene, a number of times the target control object causes the operation result to occur in a first object in the target scene, and a number of times the target control object in the target scene causes, through a second object, the operation result to occur in a third object in the target scene.

In an embodiment, the determination includes determining a second dimensional performance result based on a relationship between second dimensional data of the target user performance data and combined second dimensional data of the additional performance data, the second dimensional data being obtained in response to the target control object and a fourth object in the target scene performing a first operation in the execution process of the target scene, and the combined second dimensional data being obtained in response to an additional control object of the at least one additional control object and the fourth object in the target scene performing the first operation in the execution process of the target scene. The determination includes determining a third dimensional performance result based on third dimensional data of the target user performance data, the third dimensional data indicating a second operation completed by the target control object in the execution process of the target scene.

In an embodiment, the determination includes determining a fourth dimensional performance result based on fourth dimensional data of the target user performance data, the fourth dimensional data indicating a target result obtained by the target control object after the execution of the target scene ends.

In an embodiment, the determination includes determining the performance result based on a sum or a weighted sum of the first dimensional performance result, the second dimensional performance result, the third dimensional performance result, and the fourth dimensional performance result.

In an embodiment, the determination of the first dimensional performance result includes obtaining a weighted sum of first subdata, second subdata, and third subdata included in the first dimensional data, the first subdata indicating the number of times the operation result occurs in the target control object in the execution process of the target scene, the second subdata indicating the number of times the target control object causes the operation result to occur in the first object in the target scene, and the third subdata indicating the number of times the target control object in the target scene causes, through the second object, the operation result to occur in the third object in the target scene. The determination of the first dimensional performance result further includes determining the first dimensional performance result based on a target threshold range into which the weighted sum falls.

In an embodiment, the determination of the first dimensional performance result based on the target threshold range includes determining the first dimensional performance result as a first target value in response to the weighted sum being greater than or equal to a first threshold, inputting the weighted sum into a first sine function to obtain a first output result, determining the first output result as the first dimensional performance result in response to the weighted sum being less than the first threshold and greater than a second threshold, determining the first dimensional performance result as a second target value in response to the weighted sum being equal to the second threshold, inputting the weighted sum into a second sine function to obtain a second output result, determining the second output result as the first dimensional performance result in response to the weighted sum being less than the second threshold and greater than a third threshold, and determining the first dimensional performance result as a third target value in response to the weighted sum being equal to the third threshold.

In an embodiment, the second dimensional data includes first data and second data, the first data being obtained in response to the target control object performing the first operation on the fourth object in the execution process of the target scene, and the second data being obtained in response to the fourth object performing the first operation on the target control object in the execution process of the target scene. The combined second dimensional data includes first combined data and second combined data, the first combined data being obtained in response to the additional control object performing the first operation on the fourth object in the execution process of the target scene, and the second combined data being obtained in response to the fourth object performing the first operation on the additional control object in the execution process of the target scene. The determination of the second dimensional performance result includes determining a first attribute value based on a proportion of the first data in the first combined data, and determining a second attribute value based on a proportion of the second data in the second combined data, and determining the second dimensional performance result based on a sum or a weighted sum of the first attribute value and the second attribute value.

In an embodiment, the determination of the third dimensional performance result includes determining a target operation type of the second operation, obtaining a target attribute value corresponding to the target operation type, and determining the third dimensional performance result based on the target attribute value.

In an embodiment, the determination of the fourth dimensional performance result includes determining the fourth dimensional performance result based on a first value in response to the target result indicated by the fourth dimensional data being a first result, and determining the fourth dimensional performance result based on a second value in response to the target result indicated by the fourth dimensional data being a second result.

In an embodiment, the performance result is displayed by the terminal.

In an embodiment, the performance result includes a score for the target user.

According to another aspect of the embodiments of this application, an information processing apparatus is provided. The information processing apparatus includes processing circuitry configured to obtain target user performance data of a target control object controlled by a target user and additional performance data of at least one additional control object in an execution process of a target scene of an application. The processing circuitry is configured to determine a performance result of the target control object in the execution process of the target scene based on (i) the target user performance data and (ii) a relationship between the target user performance data and the additional performance data. The processing circuitry is configured to transmit the performance result to a terminal of the target control object.

In an embodiment, the additional performance data includes at least one of first performance data of a first control object or second performance data of a second control object, the target control object and the first control object belonging to a first group in the execution process of the target scene, and the second control object belonging to a second group in the execution process of the target scene. The processing circuitry is configured to determine the performance result of the target control object in the execution process of the target scene based on the target user performance data and a relationship between the target user performance data and the additional performance data of at least one of the first control object or the second control object.

In an embodiment, the processing circuitry is configured to determine a first dimensional performance result based on first dimensional data of the target user performance data, the first dimensional data indicating a number of times an operation result occurs in the target control object in the execution process of the target scene, a number of times the target control object causes the operation result to occur in a first object in the target scene, and a number of times the target control object in the target scene causes, through a second object, the operation result to occur in a third object in the target scene.

In an embodiment, the processing circuitry is configured to determine a second dimensional performance result based on a relationship between second dimensional data of the target user performance data and combined second dimensional data of the additional performance data, the second dimensional data being obtained in response to the target control object and a fourth object in the target scene performing a first operation in the execution process of the target scene, and the combined second dimensional data being obtained in response to an additional control object of the at least one additional control object and the fourth object in the target scene performing the first operation in the execution process of the target scene.

In an embodiment, the processing circuitry is configured to determine a third dimensional performance result based on third dimensional data of the target user performance data, the third dimensional data indicating a second operation completed by the target control object in the execution process of the target scene.

In an embodiment, the processing circuitry is configured to determine a fourth dimensional performance result based on fourth dimensional data of the target user performance data, the fourth dimensional data indicating a target result obtained by the target control object after the execution of the target scene ends.

In an embodiment, the processing circuitry is configured to determine the performance result based on a sum or a weighted sum of the first dimensional performance result, the second dimensional performance result, the third dimensional performance result, and the fourth dimensional performance result.

In an embodiment, the processing circuitry is configured to obtain a weighted sum of first subdata, second subdata, and third subdata included in the first dimensional data, the first subdata indicating the number of times the operation result occurs in the target control object in the execution process of the target scene, the second subdata indicating the number of times the target control object causes the operation result to occur in the first object in the target scene, and the third subdata indicating the number of times the target control object in the target scene causes, through the second object, the operation result to occur in the third object in the target scene. The processing circuitry is configured to determine the first dimensional performance result based on a target threshold range into which the weighted sum falls.

In an embodiment, the processing circuitry is configured to determine the first dimensional performance result as a first target value in response to the weighted sum being greater than or equal to a first threshold, input the weighted sum into a first sine function to obtain a first output result, determine the first output result as the first dimensional performance result in response to the weighted sum being less than the first threshold and greater than a second threshold, determine the first dimensional performance result as a second target value in response to the weighted sum being equal to the second threshold, input the weighted sum into a second sine function to obtain a second output result, determine the second output result as the first dimensional performance result in response to the weighted sum being less than the second threshold and greater than a third threshold, and determine the first dimensional performance result as a third target value in response to the weighted sum being equal to the third threshold.

In an embodiment, the second dimensional data includes first data and second data, the first data being obtained in response to the target control object performing the first operation on the fourth object in the execution process of the target scene, and the second data being obtained in response to the fourth object performing the first operation on the target control object in the execution process of the target scene. The combined second dimensional data includes first combined data and second combined data, the first combined data being obtained in response to the additional control object performing the first operation on the fourth object in the execution process of the target scene, and the second combined data being obtained in response to the fourth object performing the first operation on the additional control object in the execution process of the target scene. The processing circuitry is configured to determine a first attribute value based on a proportion of the first data in the first combined data, and determine a second attribute value based on a proportion of the second data in the second combined data, and determine the second dimensional performance result based on a sum or a weighted sum of the first attribute value and the second attribute value.

In an embodiment, the processing circuitry is configured to determine a target operation type of the second operation, obtain a target attribute value corresponding to the target operation type, and determine the third dimensional performance result based on the target attribute value.

In an embodiment, the processing circuitry is configured to determine the fourth dimensional performance result based on a first value in response to the target result indicated by the fourth dimensional data being a first result, and determine the fourth dimensional performance result based on a second value in response to the target result indicated by the fourth dimensional data being a second result.

In an embodiment, the performance result includes a score for the target user.

According to another aspect of the embodiments of this application, a non-transitory computer-readable storage medium is further provided, the storage medium storing a computer program, and the computer program being configured to perform the method according to any one of the foregoing aspects. For example, a non-transitory computer-readable storage medium storing instructions which when executed by at least one processor cause the at least one processor to perform obtaining target user performance data of a target control object controlled by a target user and additional performance data of at least one additional control object in an execution process of a target scene of an application, determining a performance result of the target control object in the execution process of the target scene based on (i) the target user performance data and (ii) a relationship between the target user performance data and the additional performance data, and transmitting the performance result to a terminal of the target control object.

According to another aspect of the embodiments of this application, an electronic device is further provided, including a memory and a processor, the memory storing a computer program, and the processor being configured to perform, by using the computer program, the method according to any one of the foregoing aspects.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation on the scope of this application. In the accompanying drawings:

FIG. 6 is a first schematic diagram of an application scene of an exemplary running result transmission method according to an embodiment of this application.

DESCRIPTION OF EMBODIMENTS

For a person having ordinary skill in the art to better understand the solutions in this application, the following embodiments of this application describe the technical solutions with reference to the accompanying drawings. The described embodiments are merely some but not all of the embodiments of this application. All other embodiments obtained by a person having ordinary skill in the art based on the embodiments of this application shall fall within the protection scope of this application.

In this specification and claims of this application and the drawings, terms such as "first" and "second" are used for differentiating similar objects, and are not necessarily used for describing a particular sequence or an order. It is to be understood that terms used in such a way can be used interchangeably in certain circumstances, so that the embodiments of this application described herein can be implemented in other orders than the order illustrated or described herein. Moreover, terms such as "include", "contain" and any other variations mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
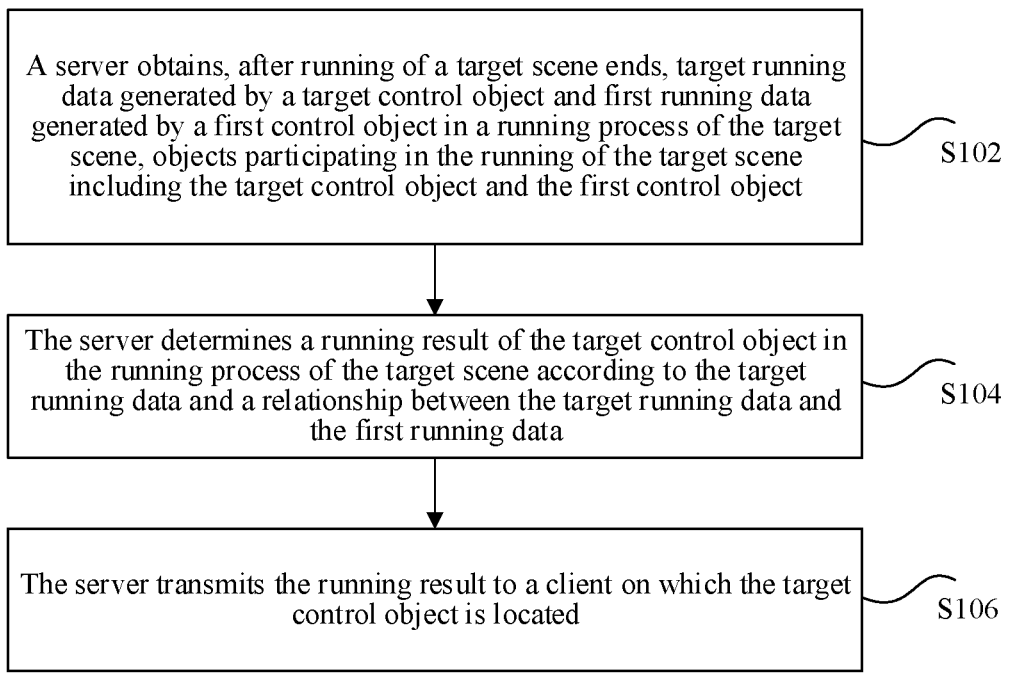
FIG. 1 is a schematic diagram of an exemplary running result transmission method according to an embodiment of this application.

According to one aspect of the embodiments of this application, a running result transmission method such as a method for providing a performance result in a computer video game application is provided. As shown in the method illustrated in FIG. 1, in step S102, a server obtains, after running of a target scene, target running data generated by a target control object and first running data generated by a first control object in a running process of the target scene, objects participating in the running of the target scene including the target control object and the first control object. For example, processing circuitry of a server obtains target user performance data of a target control object controlled by a target user and additional performance data of at least one additional control object in an execution process of a target scene of an application (e.g., a computer video game application).

In step S104, the server determines a running result of the target control object in the running process of the target scene according to the target running data and a relationship between the target running data and the first running data. For example, the processing circuitry determines a performance result of the target control object in the execution process of the target scene based on (i) the target user performance data and (ii) a relationship between the target user performance data and the additional performance data.

In step S106, the server transmits the running result to a client on which the target control object is located. For example, the processing circuitry transmits the performance result to a terminal of the target control object.

Figure 2:
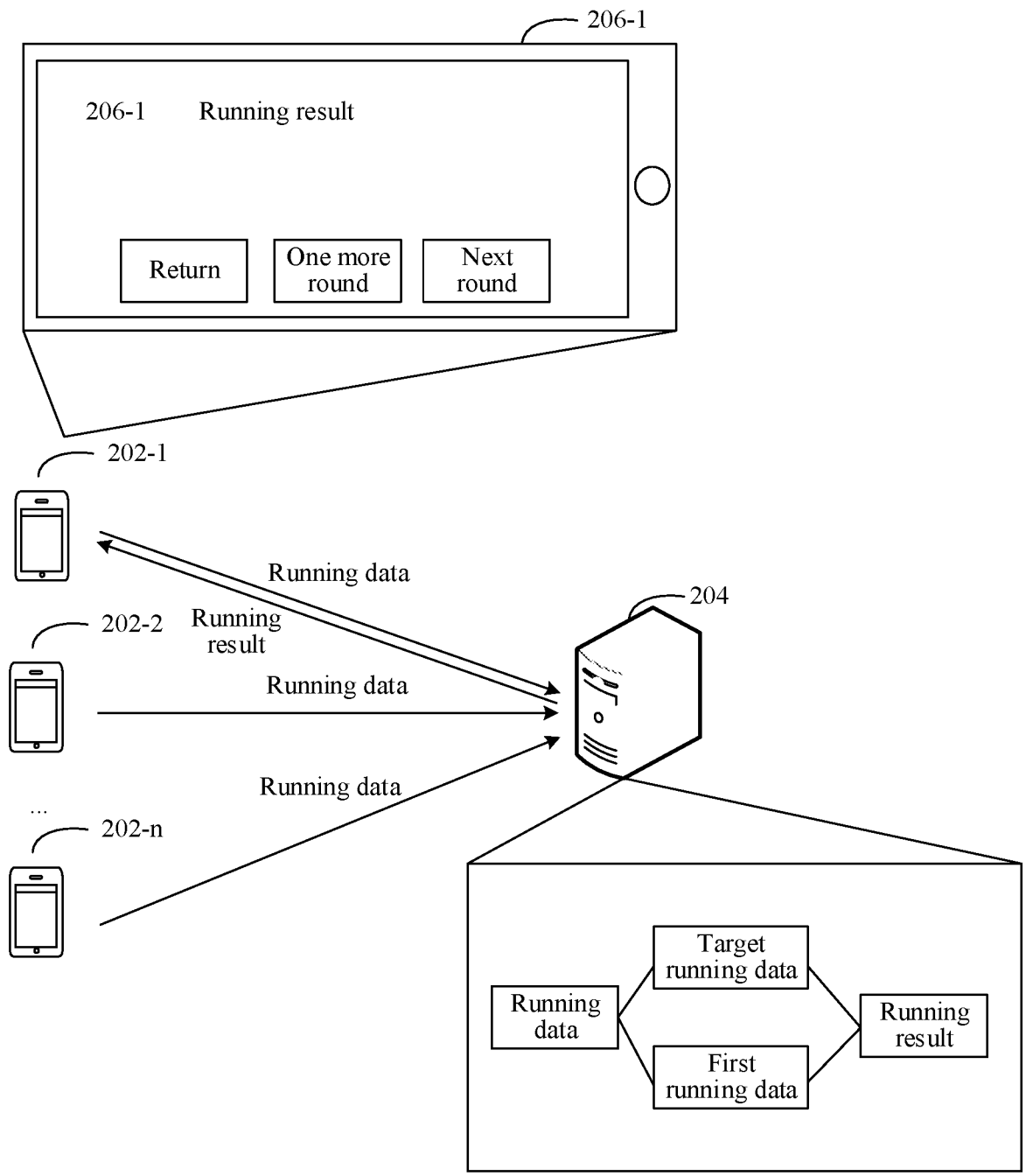
FIG. 2 is a first schematic diagram of an application environment of an exemplary running result transmission method according to an embodiment of this application.

Optionally, in this embodiment, the running result transmission method may be applied to a hardware environment including terminals 202-1 to 202-n, and a server 204 shown in FIG. 2. As shown in FIG. 2, a client 206-1 is installed on the terminal 202-1. Further, the clients 206-2 to 206-n can be installed on the clients 206-2 to 206-n, respectively. The target scene is run on all the clients 206-1 to 206-n at the same time. In an example, an object controlled by the client 206-1 in the target scene is the target control object, and objects respectively controlled by the clients 206-2 to 206-n in the target scene can collectively be referred to as additional control objects (e.g., first to n control objects). After the running of the target scene ends, the clients 206-1 to 206-n all report running data in the running process of the target scene to the server 204. The server 204 obtains, from the running data reported by the clients, target running data generated by the target control object corresponding to the client 206-1 in the running process of the target scene and additional running data generated by the additional control objects corresponding to each of the clients 206-2 to 206-n. The server 204 determines, according to the target running data and a relationship between the target running data and the additional running data, a running result of the target control object in the running process of the target scene, and transmits the running result to the client 202-1 on which the target control object is located.

Figure 3:
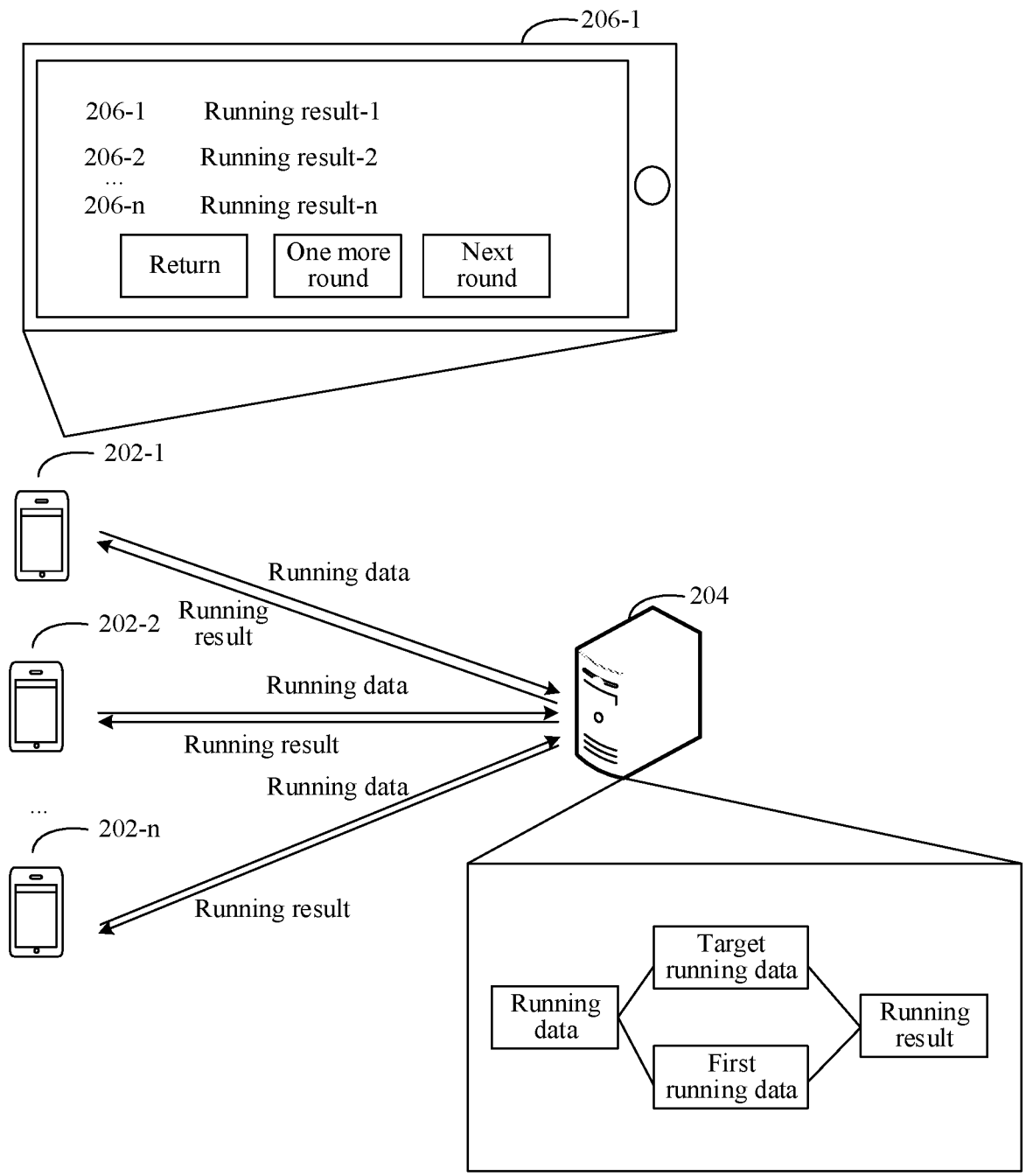
FIG. 3 is a second schematic diagram of an application environment of an exemplary running result transmission method according to an embodiment of this application.

Optionally, in this embodiment, as shown in FIG. 3, the server 204 may use a control object corresponding to each client as the target control object, and correspondingly, a control object other than that used as the target control object is an additional control object. The server 204 determines a running result corresponding to each target control object, and transmits all the determined running results to each client. The clients 206-1 to 206-n may display all received running results transmitted by the server 204, so that a user controlling a client can view a running result of the user and that of another user in the target scene that are obtained after the running of the target scene, and therefore, the user controlling the client can learn of the performance of the user in the target scene through comparison of the running results.

Optionally, in this embodiment, the running result transmission method may be applied to but is not limited to being applied to, a scene of determining a running result corresponding to the target control object in the running process of the target scene. The client may be applied to but is not limited to being applied to, various types of applications, such as a karaoke application, an instant messaging application, a social zone application, a game application, a shopping application, a browser application, a financial management application, a multimedia application, and a live broadcast application. Optionally, the running result transmission method may be applied to but is not limited to being applied to, a scene of determining a running result corresponding to the target control object in a running process of a round of game in the foregoing game application, or may be applied to but is not limited to being applied to, a scene of determining a running result corresponding to the target control object in a running process of a contest in the foregoing karaoke application, to improve accuracy in determining the running result of the target control object in the target scene. The foregoing descriptions are merely examples, and are not limited in this embodiment.

Optionally, in this embodiment, the target scene may include but is not limited to including, a scene of scoring a participant, such as a round of game, a karaoke contest, and a game instance mission.

Optionally, in this embodiment, the objects participating in the running of the target scene may include, but are not limited to including: a game character controlled by a client logged in by using a user account in a round of a game, a game character controlled by a server in a round of a game, a user account in a karaoke contest, a game account in a game instance mission, and the like.

Optionally, in this embodiment, running data generated by a control object in the running process of the target scene may include but is not limited to including: the number of times for which some operation (or action) results occur in or are caused by the control object in the running process of the target scene, output data obtained in a case that the control object performs some operations in the target scene, some operations completed by the control object in the target scene, a target result obtained by the control object in the target scene, and the like. Using a round of a game as an example, the number of times for which some operation results occur in or are caused by the control object in the running process of the target scene may include but is not limited to including: kills, deaths, assists, and the like, in a current game, of a game account participating in the current game. The output data obtained in a case that the control object performs some operations in the target scene may include but is not limited to including: damage points caused in a current game to an enemy account by a game account participating in the current game, damage points caused in a current game to a game account participating in the current game by an enemy account, and the like. Some operations completed by the control object in the target scene may include but are not limited to including: penta kill, quadra kill, triple kill, combo kill, and the like achieved in a current game by a game account participating in the current game, or may include: operation achievements obtained in a current game by a game account participating in the current game, such as ranking top in destroying turrets, obtaining gold coins, kills, and assists. The target result obtained by the control object in the target scene may include but is not limited to including: a game result obtained in a current game by a game account participating in the current game, such as "win", "lose", or "draw".

Optionally, in this embodiment, after the running of the target scene ends, the obtained target running data may be but is not limited to, data reported by clients or servers corresponding to all objects participating in the running of the target scene to a server configured to determine a running result.

Figure 4:
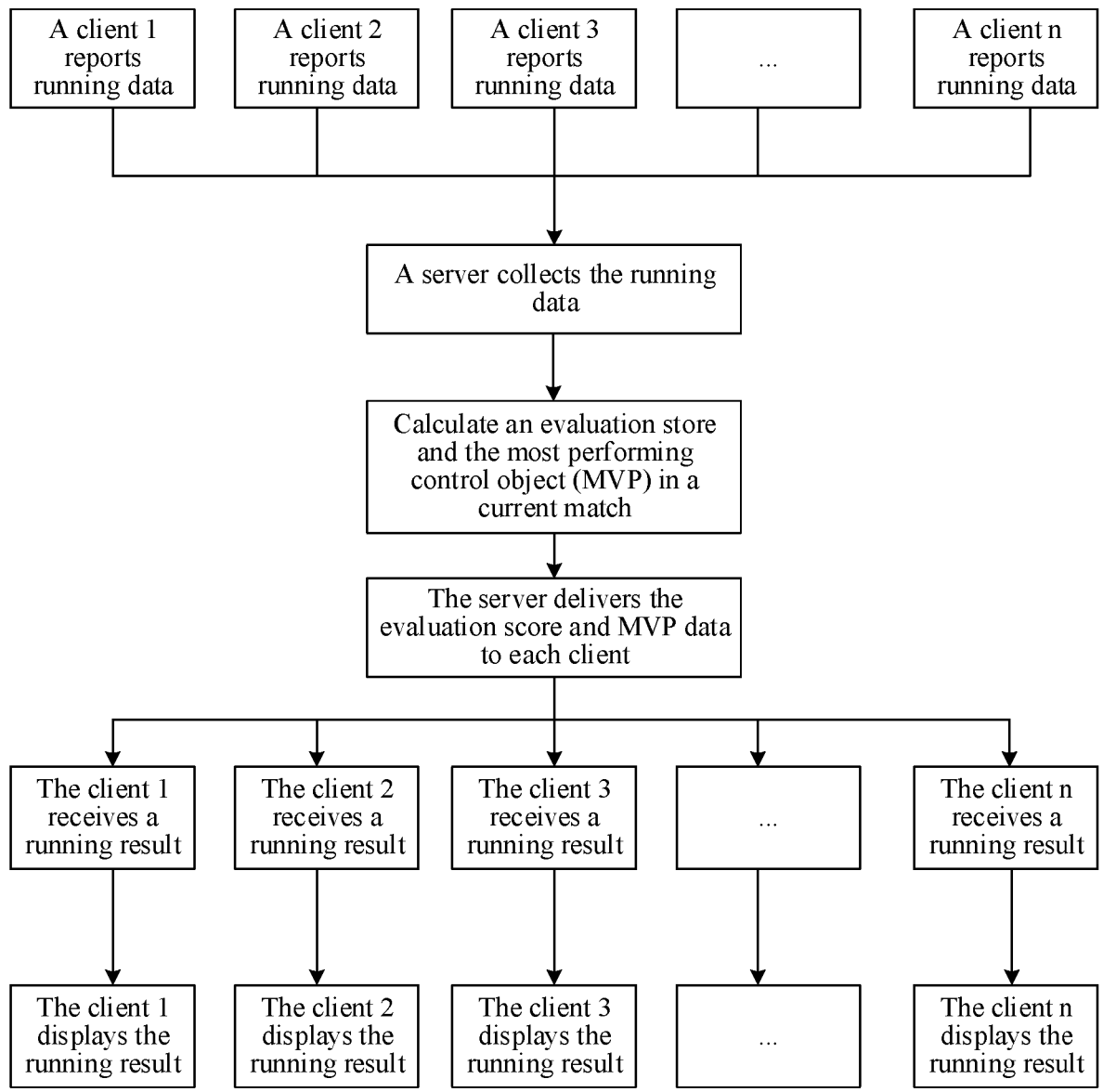
FIG. 4 is a schematic diagram of an exemplary running result transmission method according to an implementation of this application.

For example, as shown in FIG. 4, after a round of a game is over, clients 1 to n participating in the current game report all running data of the current game to a server, and the server collects the running data (theoretically, all the running data reported to the server are consistent). The server may calculate evaluation scores according to one of the pieces of running data (e.g., a running result of each target control object) and the highest performing control object (e.g., most valuable player (MVP)) in the current round of game. The server delivers the running results such as the evaluation scores and the MVP data to the clients, and upon receipt, the clients display the running results such as the evaluation scores and the MVP data in an interface (e.g., settlement or results interface) of the current game.

It can be learned that, through the foregoing steps, the running result of the target control object in the running process of the target scene is determined according to the obtained target running data and the relationship between the target running data and the additional running data after the running of the target scene ends, resolving a problem in the related art that reference factors used for determining a running result of a target control object are simple and only running data of the target control object is considered. Therefore, the running data of the target control object and a relationship between the target control object and another object in the target scene are fully considered in the process of determining the running result corresponding to the target control object, so that the running result can be more consistent with performance of the target control object in the running process of the target scene, thereby improving accuracy in determining the running result of the target control object in the target scene, and resolving the technical problem of relatively low accuracy in determining the running result of the target control object in the target scene in the related art.

In this embodiment, that the target scene is a round of a game is used as an example for describing a process of transmitting a running result. For another form of the target scene, the processing of transmitting a running result is similar, and details are not described herein again.

In an optional solution, the at least one additional control object includes a first control object and a second control object. The additional running data includes first running data generated by the first control object and second running data generated by the second control object. The target control object and the first control object belong to a first group in the running process of the target scene, and the second control object belongs to a second group in the running process of the target scene.

That the server determines a running result of the target control object in the running process of the target scene according to the target running data and a relationship between the target running data and the additional running data can include at least one of the following: S1. The server determines a running result of the target control object in the running process of the target scene according to the target running data and a relationship between the target running data and the first running data.

S2. The server determines a running result of the target control object in the running process of the target scene according to the target running data and a relationship between the target running data and the second running data.

S3. The server determines a running result of the target control object in the running process of the target scene according to the target running data and a relationship between the target running data, and the first running data and the second running data.

Optionally, in this embodiment, the objects participating in the running of the target scene may be but are not limited to being divided into a plurality of groups, and the plurality of groups may be in a relationship of opposition, alliance, or the like.

In an optional implementation, the objects participating in the running of the target scene are divided into two opposing groups is used as an example. The running result of the target control object in the running process of the target scene may be but is not limited to being determined according to the following running data.

In a first case, the running result of the target control object in the running process of the target scene is determined according to the target running data of the target control object and a relationship between the target running data and first running data of a first control object that belongs to a same group as the target control object. In this case, the running result of the target control object is determined with reference to the running data of the target control object and a relationship between the running data of the target control object and running data of a teammate of the target control object.

For example, in a round of a game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character and running data of the other game characters in the first group, so that an obtained running result can fully reflect a relative operation level of the target game character in the current group of game characters, making an evaluation of performance of a player in a game more objective.

In a second case, the running result of the target control object in the running process of the target scene is determined according to the target running data of the target control object and a relationship between the target running data and second running data of a second control object that belongs to a different group from the target control object. In this case, the running result of the target control object is determined with reference to the running data of the target control object and a relationship between the running data of the target control object and running data of an opponent of the target control object.

For example, in the foregoing round of a game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character and running data of game characters in the second group, so that an obtained running result can fully reflect a relative operation level of the target game character in the opponent game characters, making an evaluation of performance of a player in a game more objective.

In a third case, the running result of the target control object in the running process of the target scene is determined according to the target running data of the target control object and a relationship between the target running data, and first running data of a first control object that belongs to a same group as the target control object and second running data of a second control object that belongs to a different group from the target control object. In this case, the running result of the target control object is determined with reference to the running data of the target control object and a relationship between the running data of the target control object and running data of a teammate and an opponent of the target control object.

For example, in a round of game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character, running data of the other game characters in the first group, and running data of game characters in the second group, so that an obtained running result can fully reflect a relative operation level of the target game character in teammates and opponents, making an evaluation of performance of a player in a game more objective.

Through processing in the foregoing three cases, performance of the target control object in the running process of the target scene, performance of the target control object relative to its teammates, and performance of the target control object relative to its opponents can be more fully and separately considered in different cases, to more fully and accurately determine the running result of the target control object in the running process of the target scene.

In an optional solution, that the server determines a running result of the target control object in the running process of the target scene according to the target running data and a relationship between the target running data and the first running data includes S1. The server obtains first dimensional data from the target running data, and determines a first dimensional running result according to the first dimensional data, the first dimensional data being used for indicating the number of times for which an operation result occurs in the target control object in the running process of the target scene, the number of times for which the target control object causes the operation result to occur in a first object in the target scene, and the number of times for which a second object in the target scene causes, with the help of the target control object, the operation result to occur in a third object in the target scene.

S2. The server obtains second dimensional data from the target running data and total second dimensional data (or combined second dimensional data) from the first running data, and determines a second dimensional running result according to a relationship between the second dimensional data and the total second dimensional data, the second dimensional data being used for indicating output data obtained in a case that the target control object and a fourth object in the target scene perform a first operation in the running process of the target scene, and the total second dimensional data being used for indicating output data obtained in a case that the additional control object and the fourth object in the target scene perform the first operation in the running process of the target scene.

S3. The server obtains third dimensional data from the running data, and determines a third dimensional running result according to the third dimensional data, the third dimensional data being used for indicating a second operation completed by the target control object in the running process of the target scene.

S4. The server obtains fourth dimensional data from the running data, and determines a fourth dimensional running result according to the fourth dimensional data, the fourth dimensional data being used for indicating a target result obtained by the target control object after the running of the target scene ends.

S5. The server determines a sum or a weighted sum of the first dimensional running result, the second dimensional running result, the third dimensional running result, and the fourth dimensional running result as the running result.

Optionally, in this embodiment, the foregoing operation result may include but is not limited to including: death of a game character in a round of game. Death of a game character may mean but is not limited to meaning that a game account cannot control a game character within a period of time in the current game. For example, for a game character in a round of game, in a case that an attribute value of health points of the game character is 0, the game character enters a frozen state. In this state, a game account cannot control the game character to perform an operation. In this case, a game interface changes to a black and white mode and displays a countdown. After the countdown ends, the attribute value of the health points of the game character is restored to 100%, and the game account resumes control of the game character.

Optionally, in this embodiment, the first dimensional data may be used for indicating a number of deaths of a target game character in a round of game (e.g., the number of times for which the target game character has died in a round of game).

Optionally, in this embodiment, the first object may include but is not limited to including game elements that can be attacked in a round of game (e.g., an enemy game character (such as an enemy hero), a soldier, a turret, a base, a neutral, and the like in a multiplayer online battle arena (MOBA) game).

For example, the first object is an enemy hero. The first dimensional data may be used for indicating a number of kills of enemy game characters by a target game character in a round of game (e.g., the number of times for which the target game character causes the enemy game characters to die in a round of game).

Optionally, in this embodiment, the foregoing second object may include but is not limited to including: a control object that belongs to a same group as the target control object in a round of game (e.g., an ally game character (such as an ally hero) in a MOBA game). The foregoing third object may include but is not limited to including: a control object that belongs to a different group from the target control object in a round of game (e.g., an enemy game character (such as an enemy hero) in a MOBA game).

For example, the first dimensional data may be used for indicating the number of assists of a target game character in a round of game (e.g., the number of times for which an ally game character causes, with the help of the target game character, enemy game characters to die in a round of game).

Optionally, in this embodiment, the first dimensional data may include but is not limited to including: number of kills, deaths, and assists of the target control object in a running process of a round of game.

Optionally, in this embodiment, the foregoing fourth object may include but is not limited to including: a game element that can be attacked and that can launch an attack in a round of game.

Optionally, in this embodiment, the first operation may include but is not limited to including an operation that can cause damage to an operation object, for example, casting, to an operation object, a skill that can cause damage to the operation object. The operation object of the first operation may be the fourth object, the target control object, the additional control object, or the like. For example, the second dimensional data is used for indicating damage data output by the target control object attacking the fourth object in a running process of a round of game and damage data output by the fourth object attacking the target control object in a running process of a round of game, and the total second dimensional data is used for indicating damage data output by the additional control object attacking the fourth object in a running process of a round of game and damage data output by the fourth object attacking the additional control object in a running process of a round of game.

Optionally, in this embodiment, the foregoing second operation may include but is not limited to including: operations such as penta kill, quadra kill, triple kill, and combo kill that are completed by the target control object in a running process of a round of game, and operations completed by the target control object in a running process of a round of game, such as ranking top in destroying turrets, kills, assists, obtaining gold coins, damage output, and damage received.

Optionally, in this embodiment, the foregoing operation result may include but is not limited to including: win a round of game, lose a round of game, and end a round of game in a tie.

In an optional implementation, the first dimensional running result may be but is not limited to, Kill Death Assist (KDA) parameters (obtained by using data of kills, deaths, assists, and the like) of the target control object in a round of a game. The first dimensional data obtained from the target running data includes values such as kills, deaths, and assists of the target control object in the current game. The KDA parameters of the target control object in the current game are determined according to the foregoing values such as kills, deaths, and assists, to obtain the first dimensional running result.

In an optional solution, that the server determines a first dimensional running result according to the first dimensional data includes the following steps.

S1. The server obtains a weighted sum of first subdata, second subdata, and third subdata, the first dimensional data including the first subdata, the second subdata, and the third subdata, the first subdata being used for indicating the number of times for which the operation result occurs in the target control object in the running process of the target scene, the second subdata being used for indicating the number of times for which the target control object causes the operation result to occur in the first object in the target scene, and the third subdata being used for indicating the number of times for which the second object in the target scene causes, with the help of the target control object, the operation result to occur in the third object in the target scene.

S2. The server determines the first dimensional running result according to a target threshold range into which the weighted sum falls.

Optionally, in this embodiment, the target threshold range may be preset, to control a relationship between the foregoing weighted sum and the first dimensional running result.

Optionally, in this embodiment, the first dimensional running result may be but is not limited to being determined according to the relationship between the weighted sum and the target threshold range in the following manner:

The first dimensional running result is determined as a first target value in a case that the weighted sum is greater than or equal to a first threshold.

The weighted sum is input into a first sine function to obtain a first output result and the first output result is determined as the first dimensional running result, in a case that the weighted sum is less than the first threshold and greater than a second threshold.

The first dimensional running result is determined as a second target value in a case that the weighted sum is equal to the second threshold.

The weighted sum is input into a second sine function to obtain a second output result and the second output result is determined as the first dimensional running result, in a case that the weighted sum is less than the second threshold and greater than a third threshold.

The first dimensional running result is determined as a third target value in a case that the weighted sum is equal to the third threshold.

Optionally, in this embodiment, parameters such as the first threshold, the second threshold, the third threshold, the first target value, the second target value, the third target value, the first sine function, and the second sine function are separately configured to control a range of the first dimensional running result.

In the foregoing optional implementation, the first subdata may be a number of deaths, the second subdata may be a number of kills, and the third subdata may be a number assists. A weighted sum of a number of kills, deaths, and assists is obtained as a performance score of the target control object in the running process of the current game, and then the foregoing KDA parameters are determined according to a target threshold range into which the performance score falls. That is, the performance score=$k1*$kills+$k2*$assists+$k3*$deaths. In a case that the performance score is greater than M1, KDA=N1. In a case that the performance score is greater than M2 and less than M1, KDA=$\sin(\pi*$the performance score/P1$)*$Q1+R1. In a case that the performance score is equal to M2, KDA=N2. In a case that the performance score is less than M2 and greater than M3, KDA=$\sin(\pi*$the performance score/P2$)*$Q2+R2. In a case that the performance score is equal to M3, KDA=N3. All of k1, k2, k3, M1, M2, M3, N1, N2, N3, P1, P2, Q1, Q2, R1, and R2 are values that need to be preset according to requirements.

In an optional solution, the second dimensional data includes first data and second data, the first data being used for indicating output data obtained in a case that the target control object performs the first operation on the fourth object in the running process of the target scene, and the second data being used for indicating output data obtained in a case that the fourth object performs the first operation on the target control object in the running process of the target scene. The total second dimensional data includes first total data and second total data, the first total data being used for indicating total output data obtained in a case that the additional control object performs the first operation on the fourth object in the running process of the target scene, and the second total data being used for indicating total output data obtained in a case that the fourth object performs the first operation on the additional control object in the running process of the target scene. That the server determines a second dimensional running result according to a relationship between the second dimensional data and the total second dimensional data includes the following steps.

S1. The server determines a first attribute value according to a proportion of the first data in the first total data, and determines a second attribute value according to a proportion of the second data in the second total data.

S2. The server determines a sum or a weighted sum of the first attribute value and the second attribute value as the second dimensional running result.

Optionally, in this embodiment, the second dimensional data may include but is not limited to including: first data (e.g., damage points caused to an enemy hero by the target control object in a round of game) and second data (e.g., damage points caused to the target control object by an enemy hero in a round of game). The total second dimensional data may include but is not limited to including: first total data (e.g., damage points caused to an enemy hero by the additional control object in a round of game) and second total data (e.g., damage points caused to the additional control object by an enemy hero in a round of game).

Optionally, in this embodiment, the first attribute value may be but is not limited to being, determined according to a proportion of damage points caused to an enemy hero in a round of game by the target control object in total damage points of a current team. The second attribute value may be but is not limited to being, determined according to a proportion of damage points caused to the target control object in a round of game by an enemy hero in total damage points caused to the current team.

In an optional solution, that the server determines a third dimensional running result according to the third dimensional data includes the following steps.

S1. The server determines a target operation type of the second operation.

S2. The server obtains, from an operation type and an attribute value having a correspondence, a target attribute value corresponding to the target operation type, and determines the target attribute value as the third dimensional running result.

Optionally, in this embodiment, the operation type and the attribute value having a correspondence may include but is not limited to including: a correspondence between a multi kill operation and an attribute value, where for a penta kill, 0.5 point is added, for a quadra kill, 0.3 point is added, and for a triple kill, 0.1 point is added (only maximum number of kills of the target control object may be calculated during calculation of the running result); a correspondence between a combo kill operation and an attribute value, where for seven consecutive kills, 0.3 point is added; and a correspondence between an extreme value operation and an attribute value, where for ranking top in destroying turrets, 0.2 point is added, for ranking top in kills, 0.2 point is added, for ranking top in assists, 0.2 point is added, for ranking top in damage output, 0.2 point is added, for ranking top in damage received, 0.2 is added, and for ranking top in obtaining gold coins, 0.2 point is added.

Optionally, in this embodiment, the foregoing type of operation may be but is not limited to being, obtained through comparison of data of a current team or through comparison of data of all participants.

In an optional solution, that the server determines a fourth dimensional running result according to the fourth dimensional data includes the following steps.

S1. The server determines the fourth dimensional running result as a first value in a case that the target result indicated by the fourth dimensional data is a first result.

S2. The server determines the fourth dimensional running result as a second value in a case that the target result indicated by the fourth dimensional data is a second result.

Optionally, in this embodiment, the first result may be winning a game or ending a game in a tie, and the second result may be losing a game or ending a game in a tie. The first value and the second value may be set according to requirements.

In an optional implementation, a first running identifier is a victory identifier, a second running identifier is a failure identifier, the first value is 2 points, and the second value is 0 points. That is, in a round of game, for the winning party, a running result is increased by 2 points, and for the losing party, a running result is increased by 0 points.

In an optional solution, after transmitting, the running result to a client on which the target control object is located, the client displays the running result.

Optionally, in this embodiment, the server may use each object participating in the target scene as the target control object. The server determines a running result of the target control object in the running process of the target scene, and transmits running data of an object other than the target control object in the objects participating in the target scene to a client on which the target control object is located while transmitting the running result to the client on which the target control object is located. The client on which the target control object is located displays a running result of the another object while displaying the running result of the target control object.

In an optional implementation, a round of a MOBA game is used as an example. Six game characters participate in the current game and are divided into two groups, each group includes three game characters. The target control object is a game character in the first group, and is referred to as a target game character. The additional control objects are the other five game characters in the current game. After the game is over, the server obtains running data reported by each client in the current game. First dimensional data obtained by the server from running data includes a number of kills, being 10, a number of deaths, being 3, and a number of assists, being 6 of the target game character. Second dimensional data includes: damage points, being 88216, caused to a game character in the second group by the target game character, total damage points, being 334152, caused to the game characters in the second group by the game characters in the first group, damage points, being 81109, caused to the target game character by a game character in the second group, and total damage points, being 438427, caused to the game characters in the first group by the game characters in the second group. Third dimensional data includes: the target game character achieves a quadra kill once in the current game, the target game character ranks top in a number of kills in the current game, and the target game character ranks top in obtaining gold coins in the current game. Fourth dimensional data includes: the target game character wins in the current game. A performance score obtained according to the first dimensional data=kills+ 0.7*assists−1.2*deaths=10+0.7*6−1.2*3=10.6. Therefore, the performance score falls within 0 to 24. In this case, KDA=sin(π*the performance score/48)*8+6=11.12. A proportion of damage caused by the target game character and obtained according to the second dimensional data is 88216/334152=26.4%, and a proportion of damage caused to the target game character is 81109/438427=18.5%. Therefore, the proportion of the damage caused falls within 20% to 45%, and in this case, it may be determined that the first attribute value is (26.4−20)*0.08=0.512. The proportion of the foregoing damage received is less than 20%, and in this case, it may be determined that the second attribute value is 0. It may be obtained according to an operation type and an attribute value that have a correspondence that an attribute value corresponding to quadra kill is 0.3, an attribute value corresponding to ranking top in kills is 0.2, and an attribute value corresponding to ranking top in gold coins is 0.2. In addition, a fourth dimensional running result corresponding to a winning game character is 2. It can be obtained from the foregoing data that the running result of the target game character in the current game is 11.12+0.512+0+0.3+0.2+ 0.2+2=14.332.

For ease of description, the foregoing method embodiments are described as a combination of a series of actions. However, a person having ordinary skill in the art may know that this application is not limited to any described sequence of the actions. Some steps can be performed in other sequences or simultaneously according to this application. Second, a person having ordinary skilled in the art may know that the embodiments described in this specification are all exemplary embodiments and the involved actions and modules are not necessarily required by this application.

Through the foregoing descriptions of the implementations, it is clear to a person having ordinary skilled in the art that the method according to the foregoing embodiments may be implemented by using software plus a necessary universal hardware platform, and certainly may also be implemented by using hardware, but in many cases, the software implementation is utilized. Based on such an understanding, the technical solutions of this application may be represented in a form of a software product. The computer software product is stored in a storage medium (e.g., a read-only memory (ROM)/random access memory (RAM), a magnetic disk, or an optical disc), and contains several instructions for instructing a terminal device (which may be a mobile phone, a computer, a server, or a network device) to perform the method in the embodiments of this application.

Figure 5:
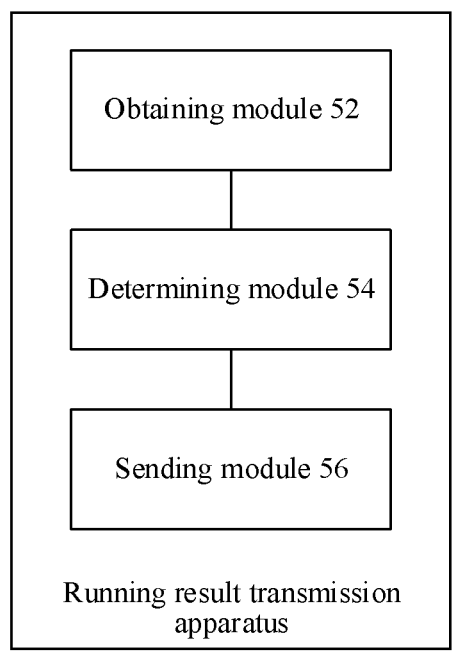
FIG. 5 is a schematic diagram of an exemplary running result transmission apparatus according to an embodiment of this application.

According to another aspect of the embodiments of this application, a running result transmission apparatus configured to implement the foregoing running result transmission method is further provided. The running results transmission apparatus can include processing circuitry configured to implement one or more modules. As shown in FIG. 5, the apparatus includes an obtaining module 52, a determining module 54, and a sending module 56.

The obtaining module 52 is configured to obtain, after running of a target scene ends, target running data generated by a target control object and first running data generated by a first control object in a running process of the target scene, objects participating in the running of the target scene including the target control object and the first control object. For example, processing circuitry of a server obtains target user performance data of a target control object controlled by a target user and additional performance data of at least one additional control object in an execution process of a target scene of an application (e.g., a computer video game application).

The determining module 54 is configured to determine a performance result of the target control object in the execution process of the target scene according to the target performance data and a relationship between the target performance data and the first performance data. For example, the processing circuitry determines a performance result of the target control object in the execution process of the target scene based on (i) the target user performance data and (ii) a relationship between the target user performance data and the additional performance data.

The sending module 56 is configured to transmit the running result to a client on which the target control object is located. For example, the processing circuitry transmits the performance result to a terminal of the target control object.

Optionally, in this embodiment, the running result transmission apparatus may be applied to the hardware environment including the terminals 202-1 to 202-n, and the server 204 shown in FIG. 2. As shown in FIG. 2, a client 206-1 is installed on the terminal 202-1. Clients 206-2 to 206-n are installed on the terminals 202-2 to 202-n, and the target scene is run on all the clients 206-1 to 206-n at the same time. In an example, an object controlled by the client 206-1 in the target scene is the target control object, and objects respectively controlled by the clients 206-2 to 206-n in the target scene are collectively referred to as additional control objects (e.g., first to n control objects). After the running of the target scene ends, the clients 206-1 to 206-n all report running data in the running process of the target scene to the server 204. The server 204 obtains, from the running data reported by the clients, target running data generated by the target control object corresponding to the client 206-1 in the running process of the target scene and additional running data generated by the additional control objects corresponding to each of the clients 206-2 to 206-n. The server 204 determines, according to the target running data and a relationship between the target running data and the additional running data, a running result of the target control object in the running process of the target scene, and transmits the running result to the client 202-1 on which the target control object is located.

Optionally, in this embodiment, as shown in FIG. 3, the server 204 may use a control object corresponding to each client as the target control object, and correspondingly, a control object other than that used as the target control object is an additional control object. The server 204 determines a running result corresponding to each target control object, and transmits all the determined running results to each client. The clients 206-1 to 206-n may display all received running result transmitted by the server 204, so that a user controlling a client can view a running result of the user and that of another user in the target scene that are obtained after the running of the target scene, and therefore, the user controlling the client can learn of the performance of the user in the target scene through comparison of the running results.

Optionally, in this embodiment, the running result transmission apparatus may be applied to but is not limited to being applied to, a scene of determining a running result corresponding to the target control object in the running process of the target scene. The client may be applied to but is not limited to being applied to, various types of applications, such as a karaoke application, an instant messaging application, a social zone application, a game application, a shopping application, a browser application, a financial management application, a multimedia application, and a live broadcast application. Optionally, the running result transmission apparatus may be applied to but is not limited to being applied to, a scene of determining a running result corresponding to the target control object in a running process of a round of game in the foregoing game application, or may be applied to but is not limited to being applied to, a scene of determining a running result corresponding to the target control object in a running process of a contest in the foregoing karaoke application, to improve accuracy in determining the running result of the target control object in the target scene. The foregoing description is merely an example, and is not limited in this embodiment.

Optionally, in this embodiment, the target scene may include but is not limited to including, a scene of scoring a participant, such as a round of game, a karaoke contest, and a game instance mission.

Optionally, in this embodiment, the objects participating in the running of the target scene may include, but are not limited to including: a game character controlled by a client logged in by using a user account in a round of game, a game character controlled by the server in a round of game, a user account in a karaoke contest, a game account in a game instance mission, and the like.

Optionally, in this embodiment, running data generated by a control object in the running process of the target scene may include but is not limited to including: the number of times for which some operation (or action) results occur in or are caused by the control object in the running process of the target scene, output data obtained in a case that the control object performs some operations in the target scene, some operations completed by the control object in the target scene, a target result obtained by the control object in the target scene, and the like. Using a round of game as an example, the number of times for which some operation results occur in or are caused by the control object in the running process of the target scene may include but is not limited to including: kills, deaths, assists, and the like, in a current game, of a game account participating in the current game. The output data obtained in a case that the control object performs some operations in the target scene may include but is not limited to including: damage points caused in a current game to an enemy account by a game account participating in the current game, damage points caused in a current game to a game account participating in the current game by an enemy account, and the like. Some operations completed by the control object in the target scene may include but are not limited to including: penta kill, quadra kill, triple kill, combo kill, and the like achieved in a current game by a game account participating in the current game, or may include: operation achievements obtained in a current game by a game account participating in the current game, such as ranking top in destroying turrets, obtaining gold coins, kills, and assists. The target result obtained by the control object in the target scene may include but is not limited to including: a game result obtained in a current game by a game account participating in the current game, such as "win", "lose", or "draw".

Optionally, in this embodiment, after the running of the target scene ends, the obtained target running data may be but is not limited to, data reported by clients or servers corresponding to all objects participating in the running of the target scene to a server configured to determine a running result.

For example, as shown in FIG. 4, after a round of a game is over, clients 1 to client n participating in the current game report all running data of the current game to a server, and the server collects the running data (theoretically, all the running data reported to the server are consistent). The server may calculate evaluation scores according to one of the pieces of running data (e.g., a running result of each target control object) and an MVP) in the current round of game. The server delivers the evaluation scores and the MVP data to the clients, and upon receipt, the clients display the evaluation scores and the MVP data in an interface (e.g., settlement or results interface) of the current game.

It can be learned that, according to the foregoing apparatus, the running result of the target control object in the running process of the target scene is determined according to the obtained target running data and the relationship between the target running data and the additional running data after the running of the target scene ends, resolving a problem in the related art that reference factors used for determining a running result of a target control object are simple and only running data of the target control object is considered. Therefore, the running data of the target control object and a relationship between the target control object and another object in the target scene are fully considered in the process of determining the running result corresponding to the target control object, so that the running result can be more consistent with performance of the target control object in the running process of the target scene, thereby improving accuracy in determining the running result of the target control object in the target scene, and resolving the technical problem of relatively low accuracy in determining the running result of the target control object in the target scene in the related art.

In this embodiment, that the target scene is a round of a game is used as an example for describing a process of transmitting a running result. For another form of the target scene, the processing of transmitting a running result is similar, and details are not described herein again.

In an optional solution, the at least one additional control object includes a first control object and a second control object. The additional running data includes first running data generated by the first control object and second running data generated by the second control object. The target control object and the first control object belong to a first group in the running process of the target scene, and the second control object belongs to a second group in the running process of the target scene.

The determining module includes one of the following:

1) a determining module, configured to determine a running result of the target control object in the running process of the target scene according to the target running data and a relationship between the target running data and the first running data;

2) a second determining module, configured to determine a running result of the target control object in the running process of the target scene according to the target running data and a relationship between the target running data and the second running data; and 3) a third determining module, configured to determine a running result of the target control object in the running process of the target scene according to the target running data and a relationship between the target running data, and the first running data and the second running data.

Optionally, in this embodiment, the objects participating in the running of the target scene may be but are not limited to being divided into a plurality of groups, and the plurality of groups may be in a relationship of opposition, alliance, or the like.

In an optional implementation, that the objects participating in the running of the target scene are divided into two opposite groups is used as an example, and the running result of the target control object in the running process of the target scene may be but is not limited to being determined according to the following running data:

In a first case, the running result of the target control object in the running process of the target scene is determined according to the target running data of the target control object and a relationship between the target running data and first running data of a first control object that belongs to a same group as the target control object. In this case, the running result of the target control object is determined with reference to the running data of the target control object and a relationship between the running data of the target control object and running data of a teammate of the target control object.

For example, in a round of game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character and running data of the other game characters in the first group, so that an obtained running result can fully reflect a relative operation level of the target game character in the current group of game characters, making an evaluation of performance of a player in a game more objective.

In a second case, the running result of the target control object in the running process of the target scene is determined according to the target running data of the target control object and a relationship between the target running data and second running data of a second control object that belongs to a different group from the target control object. In this case, the running result of the target control object is determined with reference to the running data of the target control object and a relationship between the running data of the target control object and running data of an opponent of the target control object.

For example, in the foregoing round of game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character and running data of game characters in the second group, so that an obtained running result can fully reflect a relative operation level of the target game character in the opponent game characters, making an evaluation of performance of a player in a game more objective.

In a third case, the running result of the target control object in the running process of the target scene is determined according to the target running data of the target control object and a relationship between the target running data, and first running data of a first control object that belongs to a same group as the target control object and second running data of a second control object that belongs to a different group from the target control object. In this case, the running result of the target control object is determined with reference to the running data of the target control object and a relationship between the running data of the target control object and running data of a teammate and an opponent of the target control object.

For example, in a round of game, the target control object is a target game character controlled by a target game account participating in the current game. In the current game, game characters controlled by accounts participating in the current game are divided into two groups: a first group and a second group. The target game character is in the first group. A running result of the target game character is determined with reference to running data of the target game character, running data of the other game characters in the first group, and running data of game characters in the second group, so that an obtained running result can fully reflect a relative operation level of the target game character in teammates and opponents, making an evaluation of performance of a player in a game more objective.

Through processing in the foregoing three cases, performance of the target control object in the running process of the target scene, performance of the target control object relative to its teammates, and performance of the target control object relative to its opponents can be more fully and separately considered in different cases, to more fully and accurately determine the running result of the target control object in the running process of the target scene.

In an optional solution, the determining module includes:

1) a first processing unit, configured to obtain first dimensional data from the target running data, and determine a first dimensional running result according to the first dimensional data, the first dimensional data being used for indicating the number of times for which an operation result occurs in the target control object in the running process of the target scene, the number of times for which the target control object causes the operation result to occur in a first object in the target scene, and the number of times for which a second object in the target scene causes, with the help of the target control object, the operation result to occur in a third object in the target scene;

2) a second processing unit, configured to obtain second dimensional data from the target running data and total second dimensional data (or combined second dimensional data) from the first running data, and determine a second dimensional running result according to a relationship between the second dimensional data and the total second dimensional data, the second dimensional data being used for indicating output data obtained in a case that the target control object and a fourth object in the target scene perform a first operation in the running process of the target scene, and the total second dimensional data being used for indicating output data obtained in a case that the additional control object and the fourth object in the target scene perform the first operation in the running process of the target scene;

3) a third processing unit, configured to obtain third dimensional data from the running data, and determine a third dimensional running result according to the third dimensional data, the third dimensional data being used for indicating a second operation completed by the target control object in the running process of the target scene;

4) a fourth processing unit, configured to obtain fourth dimensional data from the running data, and determine a fourth dimensional running result according to the fourth dimensional data, the fourth dimensional data being used for indicating a target result obtained by the target control object after the running of the target scene ends; and 5) a fourth determining unit, configured to determine a sum or a weighted sum of the first dimensional running result, the second dimensional running result, the third dimensional running result, and the fourth dimensional running result as the running result.

Optionally, in this embodiment, the foregoing operation result may include but is not limited to including: death of a game character in a round of game. Death of a game character may mean but is not limited to meaning that a game account cannot control a game character within a period of time in the current game. For example, for a game character in a round of game, in a case that an attribute value of health points of the game character is 0, the game character enters a frozen state. In this state, a game account cannot control the game character to perform an operation. In this case, a game interface changes to a black and white mode and displays a countdown. After the countdown ends, the attribute value of the health points of the game character is restored to 100%, and the game account resumes control of the game character.

Optionally, in this embodiment, the first dimensional data may be used for indicating a number of deaths of a target game character in a round of game (e.g., the number of times for which the target game character has died in a round of game).

Optionally, in this embodiment, the first object may include but is not limited to including game elements that can be attacked in a round of game (e.g., an enemy game character (such as an enemy hero), a soldier, a turret, a base, a neutral, and the like in a MOBA game).

For example, the first object is an enemy hero. The first dimensional data may be used for indicating a number of kills of enemy game characters by a target game character in a round of game (e.g., the number of times for which the target game character causes the enemy game characters to die in a round of game).

Optionally, in this embodiment, the foregoing second object may include but is not limited to including: a control object that belongs to a same group as the target control object in a round of game (e.g., an ally game character (such as an ally hero) in a MOBA game). The foregoing third object may include but is not limited to including: a control object that belongs to a different group from the target control object in a round of game (e.g., an enemy game character (such as an enemy hero) in a MOBA game).

For example, the first dimensional data may be used for indicating a number of assists of a target game character in a round of game (e.g., the number of times for which an ally game character causes, with the help of the target game character, enemy game characters to die in a round of game).

Optionally, in this embodiment, the first dimensional data may include but is not limited to including: number of kills, deaths, and assists of the target control object in a running process of a round of game.

Optionally, in this embodiment, the foregoing fourth object may include but is not limited to including: a game element that can be attacked and that can launch an attack in a round of game.

Optionally, in this embodiment, the first operation may include but is not limited to including an operation that can cause damage to an operation object, for example, casting, to an operation object, a skill that can cause damage to the operation object. The operation object of the first operation may be the fourth object, the target control object, the additional control object, or the like. For example, the second dimensional data is used for indicating damage data output by the target control object attacking the fourth object in a running process of a round of game and damage data output by the fourth object attacking the target control object in a running process of a round of game, and the total second dimensional data is used for indicating damage data output by the additional control object attacking the fourth object in a running process of a round of game and damage data output by the fourth object attacking the additional control object in a running process of a round of game.

Optionally, in this embodiment, the foregoing second operation may include but is not limited to including: operations such as penta kill, quadra kill, triple kill, and combo kill that are completed by the target control object in a running process of a round of game, and operations completed by the target control object in a running process of a round of game, such as ranking top in destroying turrets, kills, assists, obtaining gold coins, damage output, and damage received.

Optionally, in this embodiment, the foregoing operation result may include but is not limited to including: win a round of game, lose a round of game, and end a round of game in a tie.

In an optional implementation, the first dimensional running result may be but is not limited to, KDA parameters (obtained by using data of kills, deaths, assists, and the like) of the target control object in a round of game. The first dimensional data obtained from the target running data includes values such as kills, deaths, and assists of the target control object in the current game. The KDA parameters of the target control object in the current game are determined according to the foregoing values such as kills, deaths, and assists, to obtain the first dimensional running result.

In an optional solution, the first processing unit includes:

1) a first obtaining subunit, configured to obtain a weighted sum of first subdata, second subdata, and third subdata, the first dimensional data including the first subdata, the second subdata, and the third subdata, the first subdata being used for indicating the number of times for which the operation result occurs in the target control object in the running process of the target scene, the second subdata being used for indicating the number of times for which the target control object causes the operation result to occur in the first object in the target scene, and the third subdata being used for indicating the number of times for which the second object in the target scene causes, with the help of the target control object, the operation result to occur in the third object in the target scene; and 2) a first determining subunit, configured to determine the first dimensional running result according to a target threshold range into which the weighted sum falls.

Optionally, in this embodiment, the target threshold range may be preset, to control a relationship between the foregoing weighted sum and the first dimensional running result.

Optionally, in this embodiment, the first determining subunit is configured to:

determine first dimensional running result as a first target value in a case that the weighted sum is greater than or equal to a first threshold;

input the weighted sum into a first sine function to obtain a first output result and determine the first output result as the first dimensional running result, in a case that the weighted sum is less than the first threshold and greater than a second threshold;

determine the first dimensional running result as a second target value in a case that the weighted sum is equal to the second threshold;

input the weighted sum into a second sine function to obtain a second output result and determine the second output result as the first dimensional running result, in a case that the weighted sum is less than the second threshold and greater than a third threshold; and determine the first dimensional running result as a third target value in a case that the weighted sum is equal to the third threshold.

Optionally, in this embodiment, parameters such as the first threshold, the second threshold, the third threshold, the first target value, the second target value, the third target value, the first sine function, and the second sine function are separately configured to control a range of the first dimensional running result.

In the foregoing optional implementation, the first subdata may be a number of deaths, the second subdata may be a number of kills, and the third subdata may be a number of assists. A weighted sum of a number of kills, deaths, and assists is obtained as a performance score of the target control object in the running process of the current game, and then the foregoing KDA parameters are determined according to a target threshold range into which the performance score falls. That is, the performance score=k1*kills+ k2*assists+k3*deaths. In a case that the performance score is greater than M1, KDA=N1. In a case that the performance score is greater than M2 and less than M1, KDA=sin(π*the performance score/P1)*Q1+R1. In a case that the performance score is equal to M2, KDA=N2. In a case that the performance score is less than M2 and greater than M3, KDA=sin(π*the performance score/P2)*Q2+R2. In a case that the performance score is equal to M3, KDA=N3. All of k1, k2, k3, M1, M2, M3, N1, N2, N3, P1, P2, Q1, Q2, R1, and R2 are values that need to be preset according to requirements.

In an optional solution, the second dimensional data includes first data and second data, the first data being used for indicating output data obtained in a case that the target control object performs the first operation on the fourth object in the running process of the target scene, and the second data being used for indicating output data obtained in a case that the fourth object performs the first operation on the target control object in the running process of the target scene. The total second dimensional data includes first total data and second total data, the first total data being used for indicating total output data obtained in a case that the additional control object performs the first operation on the fourth object in the running process of the target scene, and the second total data being used for indicating total output data obtained in a case that the fourth object performs the first operation on the additional control object in the running process of the target scene. The second processing unit includes:

1) a second determining subunit, configured to determine a first attribute value according to a proportion of the first data in the first total data, and determine a second attribute value according to a proportion of the second data in the second total data; and 2) a third determining subunit, configured to determine a sum or a weighted sum of the first attribute value and the second attribute value as the second dimensional running result.

Optionally, in this embodiment, the second dimensional data may include but is not limited to including: first data (e.g., damage points caused to an enemy hero by the target control object in a round of game) and second data (e.g., damage points caused to the target control object by an enemy hero in a round of game). The total second dimensional data may include but is not limited to including: first total data (e.g., damage points caused to an enemy hero by the additional control object in a round of game) and second total data (e.g., damage points caused to the additional control object by an enemy hero in a round of game).

Optionally, in this embodiment, the first attribute value may be but is not limited to being, determined according to a proportion of damage points caused to an enemy hero in a round of game by the target control object in total damage points of a current team. The second attribute value may be but is not limited to being, determined according to a proportion of damage points caused to the target control object in a round of game by an enemy hero in total damage points caused to the current team.

In an optional solution, the third processing unit includes:

1) a fourth determining subunit, configured to determine a target operation type of the second operation; and 2) a second obtaining subunit, configured to obtain, from an operation type and an attribute value having a correspondence, a target attribute value corresponding to the target operation type, and determine the target attribute value as the third dimensional running result.

Optionally, in this embodiment, the operation type and the attribute value having a correspondence may include but is not limited to including: a correspondence between a multi kill operation and an attribute value, where for a penta kill, 0.5 point is added, for a quadra kill, 0.3 point is added, and for a triple kill, 0.1 point is added (only maximum number of kills of the target control object may be calculated during calculation of the running result); a correspondence between a combo kill operation and an attribute value, where for seven consecutive kills, 0.3 point is added; and a correspondence between an extreme value operation and an attribute value, where for ranking top in destroying turrets, 0.2 point is added, for ranking top in kills, 0.2 point is added, for ranking top in assists, 0.2 point is added, for ranking top in damage output, 0.2 point is added, for ranking top in damage received, 0.2 is added, and for ranking top in obtaining gold coins, 0.2 point is added.

Optionally, in this embodiment, the foregoing type of operation may be but is not limited to being, obtained through comparison of data of a current team or through comparison of data of all participants.

In an optional solution, the fourth processing unit includes:

1) a fifth determining subunit, configured to determine the fourth dimensional running result as a first value in a case that the target result indicated by the fourth dimensional data is a first result; and 2) a sixth determining subunit, configured to determine the fourth dimensional running result as a second value in a case that the target result indicated by the fourth dimensional data is a second result.

Optionally, in this embodiment, the first result may be winning a game or ending a game in a tie, and the second result may be losing a game or ending a game in a tie. The first value and the second value may be set according to requirements.

In an optional implementation, a first running identifier is a victory identifier, a second running identifier is a failure identifier, the first value is 2 points, and the second value is 0 points. That is, in a round of game, for the winning party, a running result is increased by 2 points, and for the losing party, a running result is increased by 0 points.

In an optional solution, after the transmitting the running result to a client on which the target control object is located, the apparatus further includes a display module, configured to display the running result on the client.

Optionally, in this embodiment, the server may use each object participating in the target scene as the target control object. The server determines a running result of the target control object in the running process of the target scene, and transmits running data of an object other than the target control object in the objects participating in the target scene to a client on which the target control object is located while transmitting the running result to the client on which the target control object is located. The client on which the target control object is located displays a running result of the another object while displaying the running result of the target control object.

In an optional implementation, a round of MOBA game is used as an example. Six game characters participate in the current game and are divided into two groups, each group includes three game characters. The target control object is a game character in the first group, and is referred to as a target game character. The additional control objects are the other five game characters in the current game. After the game is over, the server obtains running data reported by each client in the current game. First dimensional data obtained by the server from running data includes a number of kills, being 10, a number of deaths, being 3, and a number of assists, being 6 of the target game character. Second dimensional data includes: damage points, being 88216, caused to a game character in the second group by the target game character, total damage points, being 334152, caused to the game characters in the second group by the game characters in the first group, damage points, being 81109, caused to the target game character by a game character in the second group, and total damage points, being 438427, caused to the game characters in the first group by the game characters in the second group. Third dimensional data includes: the target game character achieves quadra kill once in the current game, the target game character ranks top in a number of kills in the current game, and the target game character ranks top in obtaining gold coins in the current game. Fourth dimensional data includes: the target game character wins in the current game. A performance score obtained according to the first dimensional data=kills+ 0.7*assists−1.2*deaths=10+0.7*6−1.2*3=10.6. Therefore, the performance score falls within 0 to 24. In this case, KDA=sin(π*the performance score/48)*8+6=11.12. A proportion of damage caused by the target game character and obtained according to the second dimensional data is 88216/334152=26.4%, and a proportion of damage caused to the target game character is 81109/438427=18.5%. Therefore, the proportion of the damage caused falls within 20% to 45%, and in this case, it may be determined that the first attribute value is (26.4−20)*0.08=0.512. The proportion of the foregoing damage received is less than 20%, and in this case, it may be determined that the second attribute value is 0. It may be obtained according to an operation type and an attribute value having a correspondence that an attribute value corresponding to quadra kill is 0.3, an attribute value corresponding to ranking top in kills is 0.2, and an attribute value corresponding to ranking top in gold coins is 0.2. In addition, a fourth dimensional running result corresponding to a winning game character is 2. It can be obtained from the foregoing data that the running result of the target game character in the current game is 11.12+0.512+0+0.3+0.2+0.2+2=14.332.

For an application environment of this embodiment of this application, reference may be but is not limited to being made to an application environment in the foregoing embodiment. Details are not described again in this embodiment. The embodiments of this application provide an optional example of an optional application configured to implement the foregoing running result transmission method.

In an optional embodiment, the foregoing running result transmission method may be but is not limited to being applied to the scene of determining a running result of the target control object after the running of the target scene ends shown in FIG. 6.

In this scene, evaluation of a MOBA game on game performance of a player is used as an example. Operation performance of a player is scored in an original manner based on game data of the player. Players having the highest scores in two teams are respectively a winning MVP and a losing MVP. Such a quantitative evaluation method can enable a player to clearly know game performance of the player and learn from other high-score players, and inspired by the MVP mechanism, the player actively plays games to improve skills.

In this scene, an evaluation score (equivalent to the foregoing running result) of a player account is calculated in the following manner: Evaluation score=KDA+Team score+Iconic score+Win/loss score. The KDA may refer to a value obtained according to a number of kills, deaths, and assists of a target control object in a round of game. The team score may refer to a score obtained according to damage points caused to an enemy hero by the target control object and damage points caused by the enemy hero in a round of game. The iconic score may refer to a score obtained in a case that the target control object completes an iconic operation (e.g., triple kill, quadra kill, penta kill, or ranking top in destroying turrets, kills, assists, damage output, damage received, obtaining gold coins, or the like) in a round of game. The win/loss score may refer to a score assigned to a winner object or a loser object. In the foregoing manner, data of various aspects is used, so that a calculation result of an evaluation score is more complete and objective.

Optionally, in this embodiment, the value of the evaluation score may be controlled between 0 and 21 points. A value range of each score may be determined according to importance of a constituent element and is set as follows: The KDA score is an important factor, and is set in a range of 0 to 14 points. As a bonus score, the team score is set in a range of 0 to 3 points. As a reference item, the iconic score is set in a range of 0 to 2 points. The win/loss score is set to 2 points or 0 points.

Optionally, in this embodiment, the KDA score may be obtained in the following manner. First, the performance score is obtained. The performance score=kills+assists*0.7−deaths*1.2, where 0.7 and −1.2 are weighting coefficients, which may be set according to different requirements. In this embodiment, the performance score is obtained by using an addition and subtraction method, an effect of the number of deaths is reduced, and a player is encouraged to kill more and actively participate in a game, which speeds up the rhythm of the game.

The KDA score may be calculated through data compression and by using a function according to the performance score. An optional calculation method is as follows:

$$KDA\ score = \begin{cases} 14 & \text{Performance score} \geq 24 \\ \sin(\pi*\text{Performance score}/48)*8+6 & 0 < \text{Performance score} < 24 \\ 6 & \text{Performance score} = 0 \\ \sin(\pi*\text{Performance score}/24)*6+6 & -12 < \text{Performance score} < 0 \\ 0 & \text{Performance score} \leq -12 \end{cases}$$

A function space is compressed by using the foregoing calculation method, and a feature of changing first quickly and then slowly of a sin function is used, so that scores of average players are still considerable, and it takes care of the mood of such players.

Optionally, in this embodiment, the team score may be obtained in the following manner. After a round of game is over, each client transmits running data of a current match to the server. The server extracts damage points and received-damage points of each player from the running data, and calculates a percentage of the damage points in total damage points of a current team and a percentage of the received-damage points in total received-damage points of the current team. Then the team score is calculated according to the percentage of the damage points and the percentage of the received-damage points. An optional calculation process is as follows:

Team score =

Damage bonus + Received-damage bonus. The damage and the received-damage herein refer to a percentage of damage caused to an enemy player character and a percentage of damage received from an enemy player character.

$$\text{Damage bonus} = \begin{cases} 2 & \text{Damage } \% \geq 45\% \\ (\text{Damage} - 20) * 0.08 & 20\% < \text{Damage } \% < 45\% \\ 0 & \text{Damage } \% \leq 20\% \end{cases}$$

Received-damage bonus =

$$\begin{cases} 1 & \text{Received-damage } \% \geq 45\% \\ (\text{Received-damage} - 20) * 0.04 & 20\% < \text{Received-damage } \% < 45\% \\ 0 & \text{Received-damage } \% \leq 20\% \end{cases}$$

Optionally, in this embodiment, the iconic score may be obtained in the following manner. The server obtains data of an iconic operation from the running data reported by the clients, for example, penta kill, quadra kill, triple kill, or combo kill (seven consecutive kills). In addition, a corresponding iconic score is calculated according to the obtained iconic operation. For multi kill (only highest kill is recorded): for penta kill, 0.5 point is added, for quadra kill, 0.3 point is added, and for triple kill, 0.1 point is added. For combo kill (e.g., for seven consecutive kills) 0.3 point is added.

The server may further obtain extreme value data of the current game according to received running data, for example, obtain running data (e.g., the number of destroyed turrets, kills, assists, output damage data, received-damage data, and the number of obtained gold coins) of each player in the current game, and give bonus points to a player ranking top in each operation data in the current game. For example, for ranking top in destroying turrets, 0.2 point is added, for ranking top in kills, 0.2 point is added, for ranking top in assists, 0.2 point is added, for ranking top in damage output, 0.2 point is added, for ranking top in damage received, 0.2 is added, and for ranking top in obtaining gold coins, 0.2 point is added.

Optionally, in this embodiment, the win/loss score may be calculated in the following manner: For the winner, 2 points are added, and for the loser, no point is added.

The iconic score usually indicates that a player has a highlight moment in the match. In this case, the performance score of the player is increased appropriately, so that an obtained evaluation score is more consistent with performance of the player in the current round of game.

Optionally, in this embodiment, in terms of evaluation of an MVP in a round of game, a player with the highest evaluation score from the winning party is a winning MVP, and a player with the highest evaluation score from the losing party is a losing MVP.

Optionally, in this embodiment, in a case that evaluation scores of top two members from either a winning team or a losing team are the same, 0.1 point is added to the evaluation score of one with more gold coins, to avoid a case that two players have the same evaluation scores but do not win the MVP both, thereby reducing misunderstanding of the players. A player who is a runaway player or a fake player or has other actions violating game rules in a round of game is not included in the evaluation of MVP.

In this embodiment, as shown in FIG. 6, an evaluation score obtained, for a player in a round of game, through calculation by using the foregoing method for calculating an evaluation score is displayed, together with other running data, in a settlement interface of a client of each player. A result of the evaluation score matches feelings of the player. The calculation of the evaluation score is based on a plurality of types of data, and a proportion of each type of data is distinguished according to weights, so that a calculation result is consistent with performance of the player in the game and expectation of the player. In addition, the foregoing manner of determining an evaluation score can guide behavior of a player in a more targeted manner. In a quantifiable evaluation system, the player naturally pursues a higher evaluation score, and an addition and subtraction formula may be used to make some data (e.g., a death proportion) less important in affecting the score, to encourage the player to actively participate in the game, thereby speeding up rhythm of the game.

Figure 7:
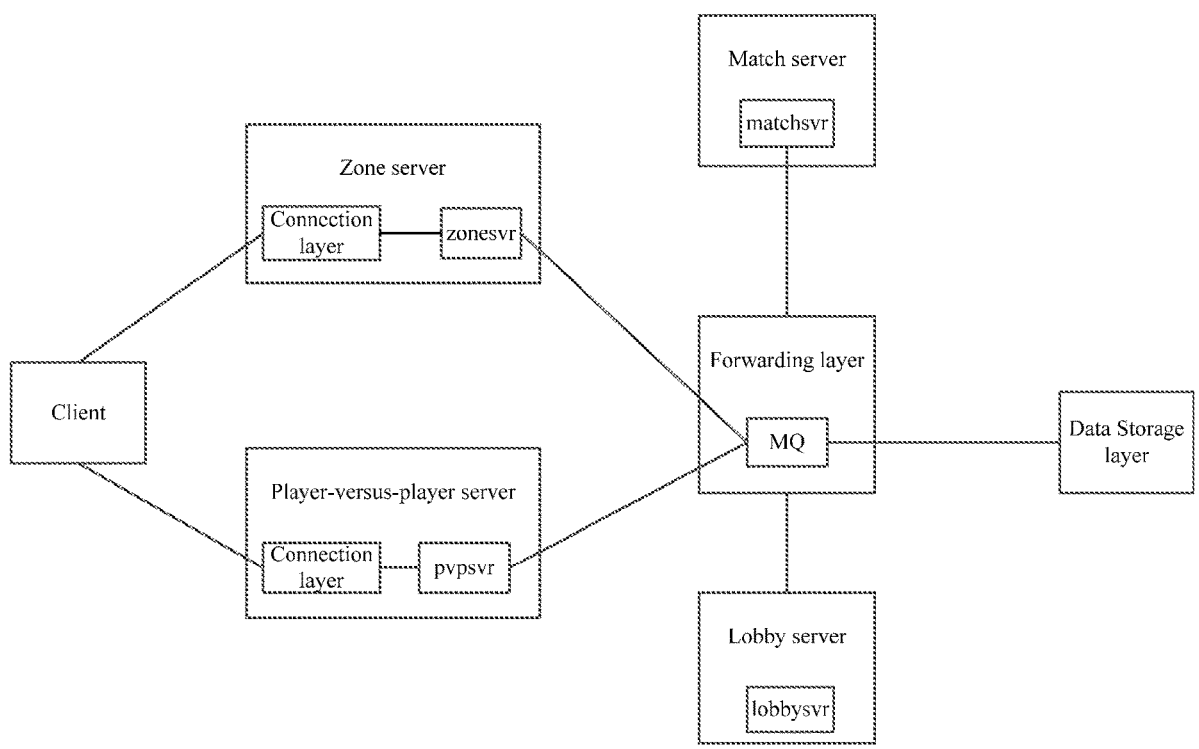
FIG. 7 is a second schematic diagram of an application scene of an exemplary running result transmission method according to an embodiment of this application.

In an optional implementation, as shown in FIG. 7, a running result transmission system is further provided. The transmission system includes: a client, a zone server: (zonesvr), a player-versus-player server: (pvpsvr), a match server: (matchsvr), a forwarding layer, a lobby server: (lobbysvr), a data storage layer, and the like.

Figure 8:
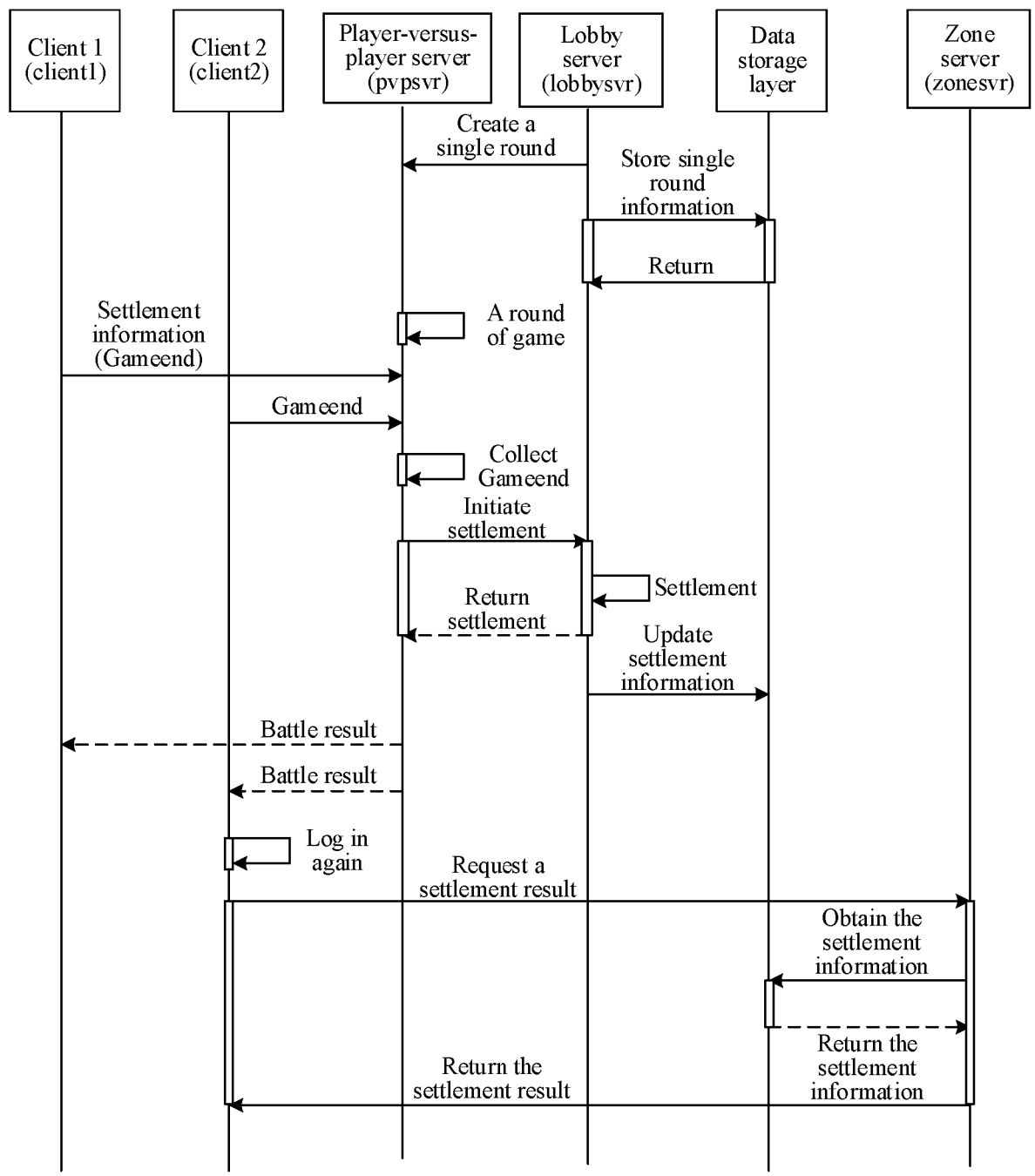
FIG. 8 is a third schematic diagram of an application scene of an exemplary running result transmission method according to an embodiment of this application.

In this optional implementation, as shown in FIG. 8, a running process of a round of game includes the following single-round sequence process:

The zone (e.g., lobby) server transmits a request to the player-versus-player server, creates a single round of game, and stores game information in a database. The player-versus-player server processes the game information. After the game is over, the client sends a message to the player-versus-player server, and the player-versus-player server collects settlement information. The player-versus-player server sends the settlement information to the zone server, and the zone server performs settlement and returns a result to the player-versus-player server (the zone server calculates an evaluation score and an MVP herein). The zone server updates the settlement information to the data storage layer. The player-versus-player server feeds back a battle result to the client. The client displays the evaluation score and the MVP in the settlement interface.

That the zone server calculates an MVP includes: comparing evaluation scores of each team, and obtaining players with the highest evaluation scores respectively as a winning MVP and a losing MVP. In a case that evaluation scores of top two members from either a winning team or a losing team are the same, 0.1 point is added to the evaluation score of one with more gold coins, to avoid a case where two players have the same evaluation scores, thereby reducing misunderstanding of the players. A runaway player in the game is not included in the MVP calculation process.

In this embodiment, a client anti-cheating method for an evaluation system is further provided. In a frame synchronization technology, theoretically, data uploaded by all clients after a single round of game is over are consistent, and a piece of data is selected during calculation from the consistent data uploaded by the clients for calculation. In a case that data of a client is inconsistent with data of other clients, it is considered that the client is not synchronized, and it may be determined, through analysis according to an actual situation, whether such a case is caused by an implementation of a game program or cheating.

Figure 9:
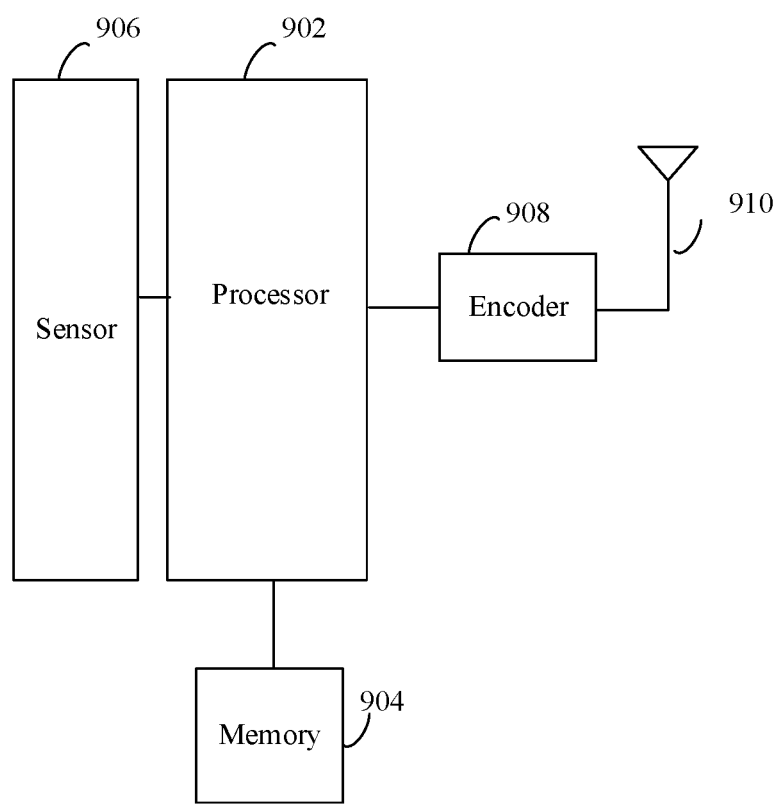
FIG. 9 is a schematic diagram of an exemplary electronic device according to an embodiment of this application.

According to still another aspect of the embodiments of this application, an electronic device configured to transmit the foregoing running result is further provided. As shown in FIG. 9, the electronic device includes one or more (only one is shown) processors 902 (e.g., processing circuitry), a memory 904, a sensor 906, an encoder 908, and a transmission apparatus 910. The memory stores a computer program. The processor is configured to perform the steps in any one of the foregoing method embodiments by using the computer program.

Optionally, in this embodiment, the foregoing electronic device may be located on at least one of a plurality of network devices in a computer network.

Optionally, in this embodiment, the foregoing processor may be configured to perform the following steps by using the computer program:

S1. Obtain, after running of a target scene ends, target running data generated by a target control object and first running data generated by a first control object in a running process of the target scene, objects participating in the running of the target scene including the target control object and the first control object. For example, target user performance data of a target control object controlled by a target user and additional performance data of at least one additional control object in an execution process of a target scene of an application (e.g., a computer video game application) are obtained.

S2. Determine a running result of the target control object in the running process of the target scene according to the target running data and a relationship between the target running data and the first running data. For example, a performance result of the target control object in the execution process of the target scene is determined based on (i) the target user performance data and (ii) a relationship between the target user performance data and the additional performance data.

S3. Transmit the running result to a client on which the target control object is located. For example, the performance result is transmitted to a terminal of the target control object.

Optionally, a person having ordinary skill in the art may understand that, the structure shown in FIG. 9 is only exemplary. Alternatively, the electronic device may be a terminal device such as a smartphone (e.g., an Android mobile phone or an iOS mobile phone), a tablet computer, a palmtop computer, a mobile Internet device (MID), or a PAD. FIG. 9 does not limit the structure of the foregoing electronic device. For example, the electronic device may alternatively include more or fewer components (e.g., a network interface and a display apparatus) than those shown in FIG. 9, or have a configuration different from that shown in FIG. 9.

The memory 904 may be configured to store a software program and a module, for example, a program instruction/module corresponding to the running result transmission method and apparatus in the embodiments of this application, and the processor 902 runs the software program and the module stored in the memory 904, to perform various functional applications and data processing, that is, implement the foregoing running result transmission method. The memory 904 may include a high-speed RAM, and may also include a non-volatile memory, such as one or more magnetic storage devices, a flash memory, or another non-volatile solid-state memory. In some examples, the memory 904 may further include memories remotely disposed relative to the processor 902, and these remote memories may be connected to a terminal through a network. Examples of the network include but are not limited to the Internet, an intranet, a local area network, a mobile communications network, and a combination thereof.

The foregoing transmission apparatus 910 is configured to receive or transmit data through a network. The examples of the network may include a wired network and a wireless network. In an example, the transmission apparatus 910 includes a network interface controller (NIC) that may be connected to another network device and a router through a network cable, thereby communicating with the Internet or a local area network. In an example, the transmission apparatus 910 is a radio frequency (RF) module that is configured to communicate with the Internet in a wireless manner.

Optionally, the memory 902 is configured to store an application program.

An embodiment of this application further provides a non-transitory computer-readable storage medium, storing a computer program, the computer program being configured to perform, during running, the steps in any one of the foregoing method embodiments.

Optionally, in this embodiment, the storage medium may be configured to store the computer program used for performing the following steps.

S1. Obtain, after running of a target scene ends, target running data generated by a target control object and first running data generated by a first control object in a running process of the target scene, objects participating in the running of the target scene including the target control object and the first control object. For example, target user performance data of a target control object controlled by a target user and additional performance data of at least one additional control object in an execution process of a target scene of an application (e.g., a computer video game application) are obtained.

S2. Determine a running result of the target control object in the running process of the target scene according to the target running data and a relationship between the target running data and the first running data. For example, a performance result of the target control object in the execution process of the target scene is determined based on (i) the target user performance data and (ii) a relationship between the target user performance data and the additional performance data.

S3. Transmit the running result to a client on which the target control object is located. For example, the performance result is transmitted to a terminal of the target control object.

Optionally, the storage medium is further configured to store the computer program used for performing the steps included in the method in the foregoing embodiments. This is not described in detail in this embodiment.

Optionally, in this embodiment, a person having ordinary skill in the art may understand that all or some of the steps in the methods of the foregoing embodiments may be implemented by a program instructing relevant hardware of the terminal device. The program may be stored in a non-transitory computer-readable storage medium. The storage medium may be a flash disk, a ROM, a RAM, a magnetic disk, or an optical disc.

The sequence numbers of the foregoing embodiments of this application are merely for description purpose and do not indicate the preference of the embodiments.

When an integrated unit in the foregoing embodiment is implemented in a form of a software functional module and sold or used as an independent product, the integrated unit may be stored in the foregoing non-transitory computer-readable storage medium. Based on such an understanding, the technical solutions of this application may be represented in a form of a software product. The computer software product is stored in a storage medium, and contains several instructions for instructing one or more computer devices (which may be a personal computer, a server, or a network device) to perform all or some of the steps of the methods in the embodiments of this application.

In the foregoing embodiments of this application, the descriptions of the embodiments have different emphases, and as for parts that are not described in detail in one embodiment, reference may be made to the relevant description of the other embodiments.

In the several embodiments provided in this application, it is to be understood that the disclosed client may be implemented in other manners. The described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of this application, and a person having ordinary skill in the art may make various improvements and refinements without departing from the principle of this application. All such improvements and refinements are to be considered as falling within the protection scope of this application.

What is claimed is:

1. A method for providing a performance result in a computer video game, comprising:
    obtaining, by processing circuitry of a network server over a network, target user performance data of a target control object controlled by a target user on a target terminal in an execution process of a target scene of the computer video game, and additional performance data of at least one additional control object controlled by a particular user, other than the target user, on a particular terminal during the execution process of the target scene of the computer video game;
    determining, by the processing circuitry, the performance result of the target control object after the execution process of the target scene based on (i) the target user performance data, (ii) the additional performance data, and (iii) a relationship between the target user performance data and the additional performance data; and
    transmitting, by the processing circuitry, the determined performance result to the target terminal of the target control object for display on the target terminal.

2. The method according to claim 1, wherein
    the additional performance data includes at least one of first performance data of a first control object or second performance data of a second control object, the target control object and the first control object belonging to a first group in the execution process of the target scene, and the second control object belonging to a second group in the execution process of the target scene,
    the determining the performance result of the target control object includes determining the performance result of the target control object in the execution process of the target scene based on the target user performance data and the relationship between the target user performance data and the additional performance data, which is that of at least one of the first control object or the second control object.

3. The method according to claim 1, wherein the determining the performance result of the target control object further comprises:
    determining a first dimensional performance result based on first dimensional data of the target user performance data, the first dimensional data indicating a number of times an operation result occurs in the target control object in the execution process of the target scene, a number of times the target control object causes the operation result to occur in a first object in the target scene, and a number of times the target control object in the target scene causes, through a second object, the operation result to occur in a third object in the target scene;
    determining a second dimensional performance result based on a relationship between second dimensional data of the target user performance data and combined second dimensional data of the additional performance data, the second dimensional data being obtained in response to the target control object and a fourth object in the target scene performing a first operation in the execution process of the target scene, and the combined second dimensional data being obtained in response to an additional control object of the at least one additional control object and the fourth object in the target scene performing the first operation in the execution process of the target scene;
    determining a third dimensional performance result based on third dimensional data of the target user performance data, the third dimensional data indicating a second operation completed by the target control object in the execution process of the target scene;
    determining a fourth dimensional performance result based on fourth dimensional data of the target user performance data, the fourth dimensional data indicating a target result obtained by the target control object after the execution of the target scene ends; and determining the performance result based on a sum or a weighted sum of the first dimensional performance result, the second dimensional performance result, the third dimensional performance result, and the fourth dimensional performance result.

4. The method according to claim 3, wherein the determining the first dimensional performance result further comprises:
obtaining a weighted sum of first subdata, second subdata, and third subdata included in the first dimensional data, the first subdata indicating the number of times the operation result occurs in the target control object in the execution process of the target scene, the second subdata indicating the number of times the target control object causes the operation result to occur in the first object in the target scene, and the third subdata indicating the number of times the target control object in the target scene causes, through the second object, the operation result to occur in the third object in the target scene; and
determining the first dimensional performance result based on a target threshold range into which the weighted sum falls.

5. The method according to claim 4, wherein the determining the first dimensional performance result based on the target threshold range further comprises:
determining the first dimensional performance result as a first target value in response to the weighted sum being greater than or equal to a first threshold;
inputting the weighted sum into a first sine function to obtain a first output result;
determining the first output result as the first dimensional performance result in response to the weighted sum being less than the first threshold and greater than a second threshold;
determining the first dimensional performance result as a second target value in response to the weighted sum being equal to the second threshold;
inputting the weighted sum into a second sine function to obtain a second output result;
determining the second output result as the first dimensional performance result in response to the weighted sum being less than the second threshold and greater than a third threshold; and
determining the first dimensional performance result as a third target value in response to the weighted sum being equal to the third threshold.

6. The method according to claim 3, wherein
the second dimensional data includes first data and second data, the first data being obtained in response to the target control object performing the first operation on the fourth object in the execution process of the target scene, and the second data being obtained in response to the fourth object performing the first operation on the target control object in the execution process of the target scene;
the combined second dimensional data includes first combined data and second combined data, the first combined data being obtained in response to the additional control object of the at least one additional control object performing the first operation on the fourth object in the execution process of the target scene, and the second combined data being obtained in response to the fourth object performing the first operation on the additional control object in the execution process of the target scene; and
the determining the second dimensional performance result includes
determining a first attribute value based on a proportion of the first data in the first combined data, and determining a second attribute value based on a proportion of the second data in the second combined data, and
determining the second dimensional performance result based on a sum or a weighted sum of the first attribute value and the second attribute value.

7. The method according to claim 3, wherein the determining the third dimensional performance result comprises:
determining a target operation type of the second operation;
obtaining a target attribute value corresponding to the target operation type; and
determining the third dimensional performance result based on the target attribute value.

8. The method according to claim 3, wherein the determining the fourth dimensional performance result comprises:
determining the fourth dimensional performance result based on a first value in response to the target result indicated by the fourth dimensional data being a first result; and
determining the fourth dimensional performance result based on a second value in response to the target result indicated by the fourth dimensional data being a second result.

9. The method according to claim 1, further comprising: displaying, by the terminal, the performance result.

10. The method according to claim 1, wherein the performance result includes a score for the target user.

11. An information processing apparatus, comprising:
processing circuitry configured to
obtain, over a network, target user performance data of a target control object controlled by a target user on a target terminal in an execution process of a target scene of a computer video game, and additional performance data of at least one additional control object controlled by a particular user, other than the target user, on a particular terminal during the execution process of the target scene of the computer video game;
determine a performance result of the target control object after the execution process of the target scene of the computer video game based on (i) the target user performance data, (ii) the additional performance data, and (iii) a relationship between the target user performance data and the additional performance data, and
transmit the determined performance result to the target terminal of the target control object for display on the target terminal.

12. The information processing apparatus according to claim 11, wherein
the additional performance data includes at least one of first performance data of a first control object or second performance data of a second control object, the target control object and the first control object belonging to a first group in the execution process of the target scene, and the second control object belonging to a second group in the execution process of the target scene, and
the processing circuitry is configured to determine the performance result of the target control object in the execution process of the target scene based on the target user performance data and the relationship between the target user performance data and the additional performance data, which is that of at least one of the first control object or the second control object.

13. The information processing apparatus according to claim 11, wherein the processing circuitry is further configured to:
determine a first dimensional performance result based on first dimensional data of the target user performance data, the first dimensional data indicating a number of times an operation result occurs in the target control object in the execution process of the target scene, a number of times the target control object causes the operation result to occur in a first object in the target scene, and a number of times the target control object in the target scene causes, through a second object, the operation result to occur in a third object in the target scene;
determine a second dimensional performance result based on a relationship between second dimensional data of the target user performance data and combined second dimensional data of the additional performance data, the second dimensional data being obtained in response to the target control object and a fourth object in the target scene performing a first operation in the execution process of the target scene, and the combined second dimensional data being obtained in response to an additional control object of the at least one additional control object and the fourth object in the target scene performing the first operation in the execution process of the target scene;
determine a third dimensional performance result based on third dimensional data of the target user performance data, the third dimensional data indicating a second operation completed by the target control object in the execution process of the target scene;
determine a fourth dimensional performance result based on fourth dimensional data of the target user performance data, the fourth dimensional data indicating a target result obtained by the target control object after the execution of the target scene ends; and
determine the performance result based on a sum or a weighted sum of the first dimensional performance result, the second dimensional performance result, the third dimensional performance result, and the fourth dimensional performance result.

14. The information processing apparatus according to claim 13, wherein the processing circuitry is further configured to
obtain a weighted sum of first subdata, second subdata, and third subdata included in the first dimensional data, the first subdata indicating the number of times the operation result occurs in the target control object in the execution process of the target scene, the second subdata indicating the number of times the target control object causes the operation result to occur in the first object in the target scene, and the third subdata indicating the number of times the target control object in the target scene causes, through the second object, the operation result to occur in the third object in the target scene; and
determine the first dimensional performance result based on a target threshold range into which the weighted sum falls.

15. The information processing apparatus according to claim 14, wherein the processing circuitry is further configured to determine the first dimensional performance result as a first target value in response to the weighted sum being greater than or equal to a first threshold;
input the weighted sum into a first sine function to obtain a first output result;
determine the first output result as the first dimensional performance result in response to the weighted sum being less than the first threshold and greater than a second threshold;
determine the first dimensional performance result as a second target value in response to the weighted sum being equal to the second threshold;
input the weighted sum into a second sine function to obtain a second output result;
determine the second output result as the first dimensional performance result in response to the weighted sum being less than the second threshold and greater than a third threshold; and
determine the first dimensional performance result as a third target value in response to the weighted sum being equal to the third threshold.

16. The information processing apparatus according to claim 13, wherein
the second dimensional data includes first data and second data, the first data being obtained in response to the target control object performing the first operation on the fourth object in the execution process of the target scene, and the second data being obtained in response to the fourth object performing the first operation on the target control object in the execution process of the target scene;
the combined second dimensional data includes first combined data and second combined data, the first combined data being obtained in response to the additional control object performing the first operation on the fourth object in the execution process of the target scene, and the second combined data being obtained in response to the fourth object performing the first operation on the additional control object in the execution process of the target scene; and
the processing circuitry is further configured to
determine a first attribute value based on a proportion of the first data in the first combined data, and determine a second attribute value based on a proportion of the second data in the second combined data, and
determine the second dimensional performance result based on a sum or a weighted sum of the first attribute value and the second attribute value.

17. The information processing apparatus according to claim 13, wherein the processing circuitry is further configured to
determine a target operation type of the second operation;
obtain a target attribute value corresponding to the target operation type; and
determine the third dimensional performance result based on the target attribute value.

18. The information processing apparatus according to claim 13, wherein the processing circuitry is further configured to
determine the fourth dimensional performance result based on a first value in response to the target result indicated by the fourth dimensional data being a first result; and determine the fourth dimensional performance result based on a second value in response to the target result indicated by the fourth dimensional data being a second result.

19. The information processing apparatus according to claim 11, wherein the performance result determined by the processing circuitry includes a score for the target user.

20. A non-transitory computer-readable storage medium storing instructions which when executed by processing circuitry cause the processing circuitry to perform:
- obtaining, over a network, target user performance data of a target control object controlled by a target user on a target terminal in an execution process of a target scene of a computer video game, and additional performance data of at least one additional control object controlled by a particular user, other than the target user, on a particular terminal during the execution process of the target scene of the computer video game;
- determining a performance result of the target control object after the execution process of the target scene of the computer video game based on (i) the target user performance data, (ii) the additional performance data, and (iii) a relationship between the target user performance data and the additional performance data; and
- transmitting the determined performance result to the target terminal of the target control object for display on the target terminal.

* * * * *